United States Patent
Owens et al.

(10) Patent No.: US 6,433,313 B1
(45) Date of Patent: Aug. 13, 2002

(54) APPARATUS AND METHOD FOR HEATED FOOD DELIVERY

(75) Inventors: Byron C. Owens, Asheboro; Mark E. Van Hoy, Greensboro; William M. Bostic, Asheboro, all of NC (US)

(73) Assignee: Vesture Corporation, Asheboro, NC (US)

( * ) Notice: Subject to any disclaimer, the term of this patent is extended or adjusted under 35 U.S.C. 154(b) by 0 days.

(21) Appl. No.: 09/611,761

(22) Filed: Jul. 7, 2000

Related U.S. Application Data

(63) Continuation-in-part of application No. 09/504,550, filed on Feb. 15, 2000, now Pat. No. 6,353,208.

(51) Int. Cl.[7] .............................. A21B 1/52; F24H 7/00; H05B 1/02; F27D 11/02
(52) U.S. Cl. ........................................ 219/387; 219/413
(58) Field of Search ................................ 219/385–387, 219/399, 409, 410, 413, 620, 621

(56) References Cited

U.S. PATENT DOCUMENTS

| | | | |
|---|---|---|---|
| 1,377,092 A | 5/1921 | Phaneuf | |
| 1,439,094 A | 12/1922 | Gingras | |
| 1,558,278 A | 10/1925 | Phillips | |
| 1,683,889 A | 9/1928 | Hayne | |
| 2,114,396 A | 4/1938 | McFarlan et al. | |
| 2,298,299 A | 10/1942 | Joy et al. | |
| 2,479,268 A | 8/1949 | Sarria | |
| 2,577,870 A | 12/1951 | Aston | |
| 2,584,302 A | 2/1952 | Stein | |
| 2,640,478 A | 6/1953 | Flournoy | |

(List continued on next page.)

FOREIGN PATENT DOCUMENTS

| | | |
|---|---|---|
| CA | 665316 | 6/1963 |
| EP | 0 001 151 A2 | 3/1979 |
| EP | 0 130 478 A1 | 1/1985 |
| FR | 1 265 502 | 12/1961 |
| FR | 2 521 408 | 8/1983 |
| GB | 1 426 505 | 3/1976 |
| GB | 2 054 348 A | 2/1981 |
| GB | 2 056 264 A | 3/1981 |
| GB | 2 160 965 A | 1/1986 |
| GB | 2 195 015 A | 3/1988 |
| GB | 2 255 170 A | 10/1992 |
| GB | 2 272 969 A | 6/1994 |
| JP | 57-96078 | 6/1982 |
| JP | 57-96978 | 6/1982 |
| JP | 62-241287 | 10/1987 |
| WO | WO 87/06803 | 11/1987 |

OTHER PUBLICATIONS

Ingrid, Inc. advertisements for Thermal Bags (6 pages) (Date Unknown).

Primary Examiner—Joseph Pelham
(74) Attorney, Agent, or Firm—Merchant & Gould P.C.

(57) ABSTRACT

A delivery apparatus includes a container for holding an article to be delivered and a heater, and an enunciating device for displaying temperature conditions within the container. The container includes a plurality of walls forming an interior area and an opening, wherein the opening is provided with a size sufficient to allow movement of the article and the heater from outside the container to within the interior area of the container. The container includes a flap for selectively covering and uncovering the opening to allow access to the interior area of the container. The heater is constructed and arranged for placement within the interior area of the container and is provided for heating the article. The enunciating device includes a temperature sensor for sensing temperature within the container, a temperature display for displaying temperature conditions within the container, and a power source for operating the enunciating device. A method for delivering food and an enunciating device are provided.

18 Claims, 31 Drawing Sheets

U.S. PATENT DOCUMENTS

| | | | |
|---|---|---|---|
| 2,767,563 A | 10/1956 | Picascia | |
| 2,771,754 A | 11/1956 | Winkler | |
| 2,980,881 A | 4/1961 | McKee | |
| 3,017,493 A | 1/1962 | Cooke | |
| 3,019,783 A | 2/1962 | Clarke | |
| 3,051,582 A | 8/1962 | Muckler et al. | |
| 3,079,486 A | 2/1963 | Winchell | |
| 3,084,241 A | 4/1963 | Carrona | |
| 3,118,560 A | 1/1964 | Cornelius | |
| 3,148,676 A | 9/1964 | Truog et al. | |
| 3,202,801 A | 8/1965 | Saluri | |
| 3,273,634 A | 9/1966 | Snelling | |
| 3,292,628 A | 12/1966 | Maxwell et al. | |
| 3,322,113 A | 5/1967 | Simjian | |
| 3,356,828 A | 12/1967 | Furness | |
| 3,470,944 A | 10/1969 | Segal | |
| 3,521,030 A | 7/1970 | Maahs | |
| 3,549,861 A | 12/1970 | Trachtenberg et al. | |
| 3,557,774 A | 1/1971 | Kreis | |
| 3,596,059 A | 7/1971 | Hager, Jr. | |
| 3,603,106 A | 9/1971 | Ryan et al. | |
| 3,608,627 A | 9/1971 | Shevlin | |
| 3,608,770 A | 9/1971 | Naimoli | |
| 3,613,933 A | 10/1971 | Pilz et al. | |
| 3,665,939 A | 5/1972 | Laing | |
| 3,721,803 A | 3/1973 | DiStefano | |
| 3,734,077 A | 5/1973 | Murdough et al. | |
| 3,739,148 A | 6/1973 | Ryckman, Jr. | |
| 3,746,837 A | 7/1973 | Frey et al. | |
| 3,754,640 A | 8/1973 | Bridges | |
| 3,780,262 A | 12/1973 | Rudd | |
| 3,805,018 A | 4/1974 | Luong et al. | |
| 3,823,089 A | 7/1974 | Ryan et al. | |
| 3,916,872 A | 11/1975 | Kreis et al. | |
| 4,035,606 A | 7/1977 | Browder | |
| 4,134,004 A | 1/1979 | Anderson et al. | |
| 4,147,921 A | 4/1979 | Walter et al. | |
| 4,158,126 A | 6/1979 | Seitz | |
| 4,182,405 A | 1/1980 | Hysen et al. | |
| 4,198,559 A | 4/1980 | Walter et al. | |
| 4,199,021 A | 4/1980 | Thoma | |
| 4,201,218 A | 5/1980 | Feldman et al. | |
| 4,246,884 A | 1/1981 | Vandas | |
| 4,258,695 A | 3/1981 | McCarton et al. | |
| 4,335,725 A | 6/1982 | Geldmacher | |
| 4,419,568 A * | 12/1983 | Overloop | 219/386 |
| 4,505,252 A | 3/1985 | Wada et al. | |
| 4,510,919 A | 4/1985 | Benmussa | |
| 4,528,439 A | 7/1985 | Marney, Jr. et al. | |
| 4,533,061 A | 8/1985 | Herbst | |
| 4,543,471 A * | 9/1985 | Anderson | 219/387 |
| 4,559,921 A | 12/1985 | Benmussa | |
| 4,561,441 A | 12/1985 | Kolodziej | |
| 4,567,877 A | 2/1986 | Sepahpur | |
| 4,578,814 A | 3/1986 | Skamser | |
| D287,921 S | 1/1987 | Skamser | |
| 4,672,178 A | 6/1987 | Wada et al. | |
| 4,702,235 A | 10/1987 | Hong | |
| 4,743,726 A | 5/1988 | Hughes et al. | |
| 4,777,346 A | 10/1988 | Swanton, Jr. | |
| 4,777,931 A | 10/1988 | Ziegler et al. | |
| 4,802,233 A | 1/1989 | Skamser | |
| 4,806,736 A | 2/1989 | Schirico | |
| 4,816,646 A | 3/1989 | Solomon et al. | |
| 4,817,704 A | 4/1989 | Yamashita | |
| 4,868,898 A | 9/1989 | Seto | |
| 4,894,931 A | 1/1990 | Senee et al. | |
| 4,904,846 A | 2/1990 | Oscadal | |
| 4,907,750 A | 3/1990 | Seifert | |
| 4,916,290 A | 4/1990 | Hawkins | |
| 4,917,076 A | 4/1990 | Nadolph et al. | |
| 4,920,964 A | 5/1990 | Francis, Jr. | |
| 4,929,094 A | 5/1990 | Becker | |
| 4,933,534 A | 6/1990 | Cunningham et al. | |
| 4,979,923 A | 12/1990 | Tanaka | |
| 4,982,722 A | 1/1991 | Wyatt | |
| 4,983,798 A | 1/1991 | Eckler et al. | |
| 5,009,228 A | 4/1991 | Clark | |
| 5,016,756 A | 5/1991 | Wischhusen et al. | |
| 5,050,595 A | 9/1991 | Krafft | |
| 5,052,369 A | 10/1991 | Johnson | |
| 5,062,414 A | 11/1991 | Grim | |
| 5,078,050 A | 1/1992 | Smith | |
| 5,125,391 A | 6/1992 | Srivastava et al. | |
| 5,128,522 A | 7/1992 | Marx et al. | |
| 5,150,707 A | 9/1992 | Anderson | |
| 5,151,578 A | 9/1992 | Phillips | |
| 5,159,177 A | 10/1992 | Kinberger | |
| 5,184,725 A | 2/1993 | Reinheimer et al. | |
| 5,211,949 A | 5/1993 | Salyer | |
| 5,220,954 A | 6/1993 | Longardner et al. | |
| 5,254,380 A | 10/1993 | Salyer | |
| 5,300,105 A | 4/1994 | Owens | |
| 5,314,005 A | 5/1994 | Dobry | |
| 5,329,096 A | 7/1994 | Suematsu | |
| 5,336,255 A | 8/1994 | Kanare et al. | |
| 5,339,541 A | 8/1994 | Owens | |
| 5,357,693 A | 10/1994 | Owens | |
| 5,404,808 A | 4/1995 | Smith et al. | |
| 5,405,671 A | 4/1995 | Kamin et al. | |
| 5,408,576 A * | 4/1995 | Bishop | 219/386 |
| 5,423,996 A | 6/1995 | Salyer | |
| 5,424,519 A | 6/1995 | Salee | |
| 5,442,156 A | 8/1995 | Westerman et al. | |
| 5,454,471 A | 10/1995 | Norvell | |
| 5,470,002 A | 11/1995 | DiStefano et al. | |
| 5,520,103 A | 5/1996 | Zielinski et al. | |
| 5,551,615 A | 9/1996 | McIntosh | |
| 5,552,075 A | 9/1996 | Salyer | |
| 5,565,132 A | 10/1996 | Salyer | |
| 5,650,090 A | 7/1997 | Salyer | |
| 5,687,706 A | 11/1997 | Goswami et al. | |
| 5,750,962 A | 5/1998 | Hyatt | |
| 5,880,435 A | 3/1999 | Bostic | |
| 5,884,006 A | 3/1999 | Frohlich et al. | |
| 5,892,202 A | 4/1999 | Baldwin et al. | |
| 5,932,129 A | 8/1999 | Hyatt | |
| 5,999,699 A | 12/1999 | Hyatt | |
| 6,018,143 A | 1/2000 | Check | |
| 6,091,053 A * | 7/2000 | Aonuma | 219/387 |
| 6,121,578 A | 9/2000 | Owens et al. | |
| 6,130,411 A * | 10/2000 | Rockenfeller et al. | 219/386 |
| 6,232,585 B1 * | 5/2001 | Clothier et al. | 219/620 |
| 6,300,599 B1 | 10/2001 | Owens et al. | |

* cited by examiner

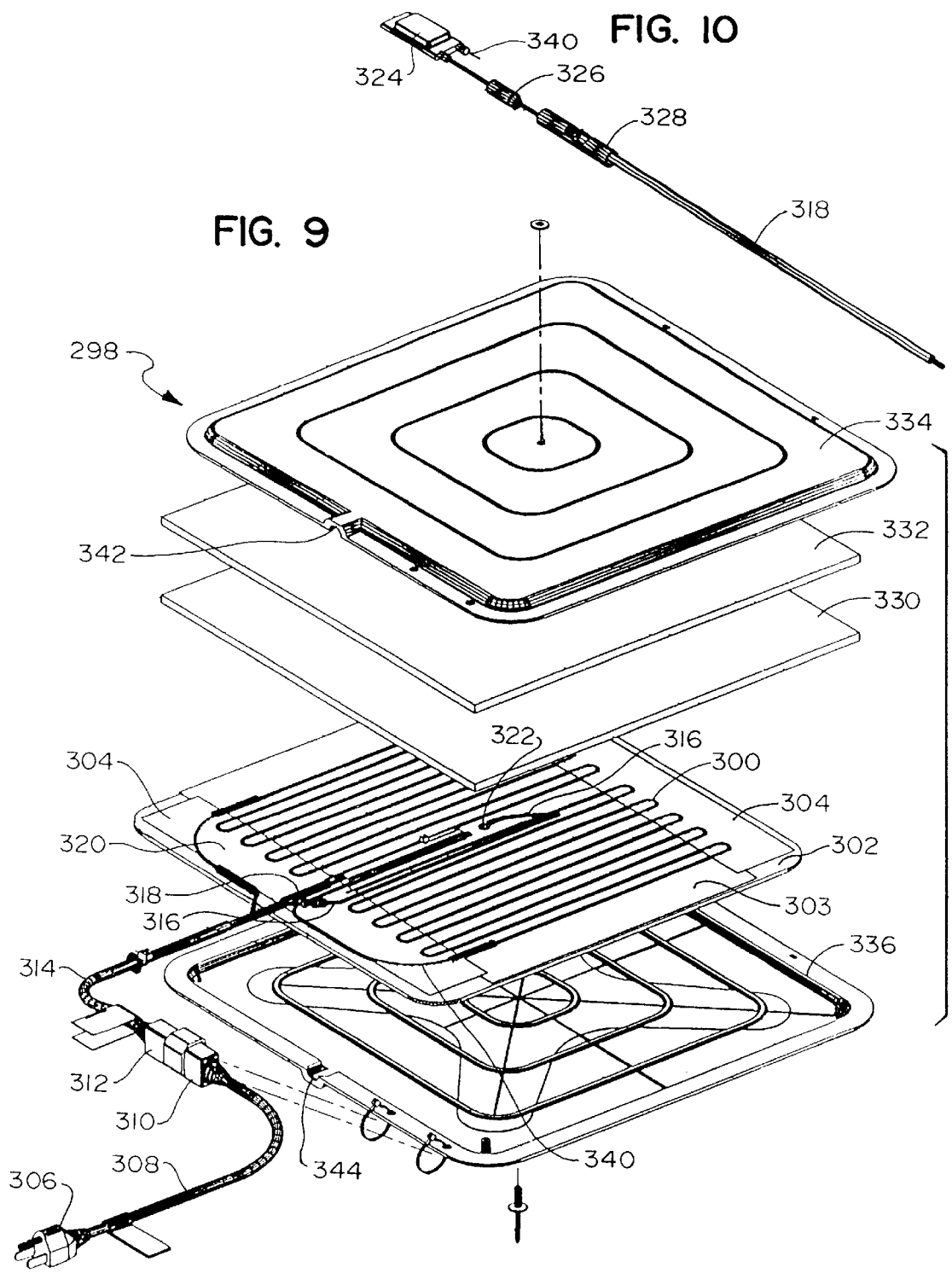

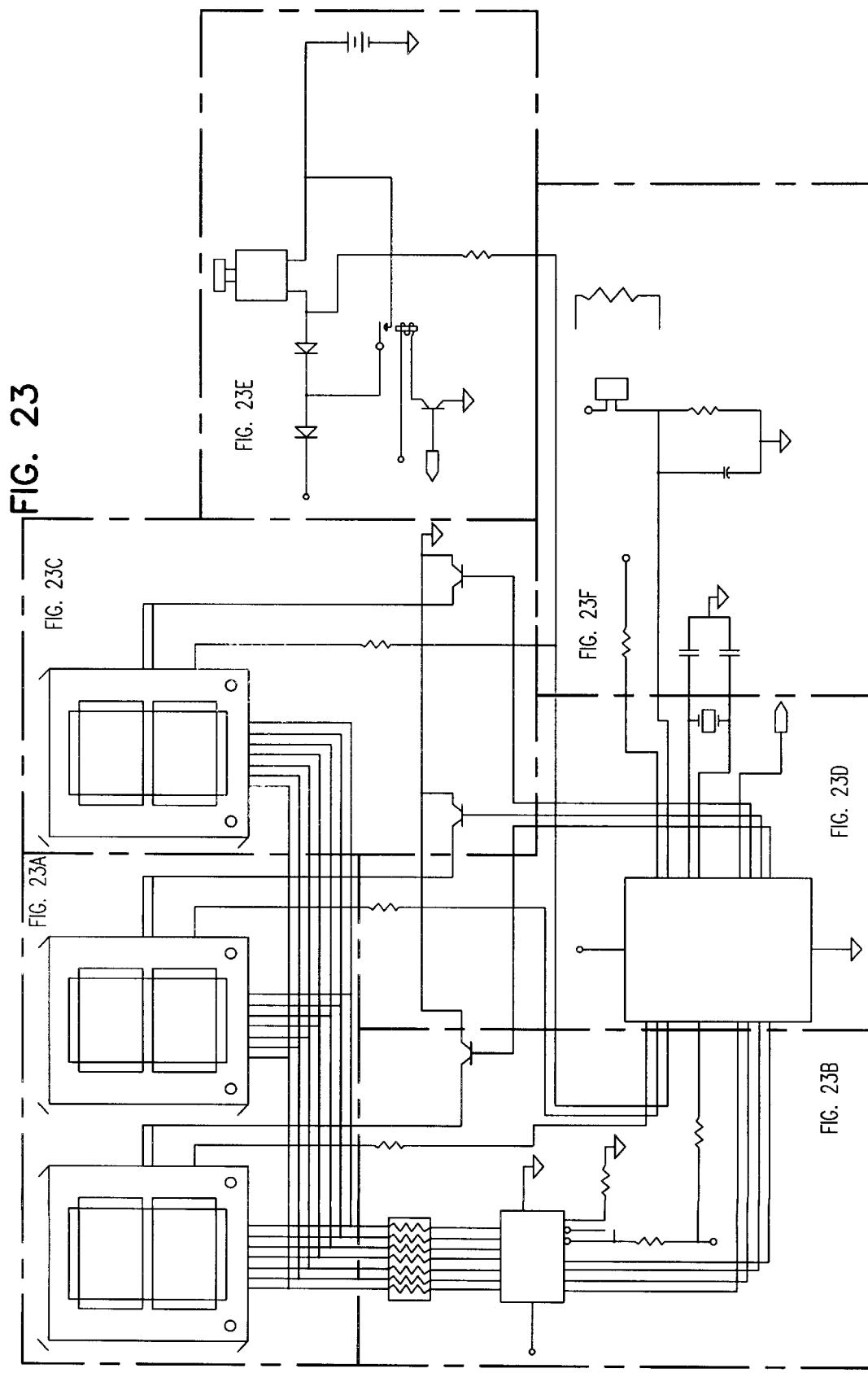

APPARATUS AND METHOD FOR HEATED FOOD DELIVERY

This application is a continuation in part application of U.S. patent application Ser. No. 09/504,550, issued as U.S. Pat. No. 6,353,208, that was filed with the United States Patent and Trademark Office on Feb. 15, 2000. The entire disclosure of U.S. patent application Ser. No. 09/504,550 is incorporated herein by reference.

FIELD OF THE INVENTION

The invention relates to a delivery apparatus for keeping food product warm during transport, and to a method for delivering food.

BACKGROUND OF THE INVENTION

Food products, such as pizza, are frequently prepared and cooked at a store location. The prepared food product is then delivered to a customer at a home or place of business.

A freshly cooked food product may be stored at the store location awaiting a delivery person's transportation of the food product to the customer. It is common to prepare pizza and store it in a cardboard box. The cardboard box is placed under a heat lamp awaiting pickup by a delivery person. The delivery person then stores the cardboard box in a thermally insulated carrying case for delivery to the consumer. Despite these methods, the product may lose heat during storage and transportation and the temperature of the product may decrease. If the product becomes too cool, it may become unacceptable to a customer. As a result, attention has been directed at techniques for keeping a food product warm after it has been cooked.

The prior art describes delivery apparatus that can be used to keep food items warm during transportation. For example the following U.S. Patents describe such prior art delivery apparatus: U.S. Pat. No. 5,999,699 to Hyatt; U.S. Pat. No. 5,932,129 to Hyatt; U.S. Pat. No. 5,892,202 to Baldwin et al.; U.S. Pat. No. 5,880,435 to Bostic; U.S. Pat. No. 5,884,006 to Frohlich et al.; and U.S. Pat. No. 5,750,962 to Hyatt.

SUMMARY OF THE INVENTION

A delivery apparatus is provided by the invention. The delivery apparatus includes a container for holding an article to be delivered and a heater, and an enunciating device for displaying temperature conditions within the container. The container includes a plurality of walls forming an interior area and an opening, wherein the opening is provided with a size sufficient to allow movement of the article and the heater from outside the container to within the interior area of the container. The container includes a flap for selectively covering and uncovering the opening to allow access to the interior area of the container. The heater is constructed and arranged for placement within the interior area of the container and is provided for heating the article. The enunciating device includes a temperature sensor for sensing temperature within the container, a temperature display for displaying temperature conditions within the container, and a power source for operating the enunciating device.

A method for delivering food is provided by the invention. The method includes steps of (a) charging the delivery apparatus with thermal energy and (b) delivering food in the delivery apparatus.

An enunciating device is provided according to the invention. The enunciating device includes a temperature sensor for sensing temperature within a container, a temperature display for displaying temperature conditions within the container, and a power source for operating the enunciating device. The enunciating device can be constructed so that it is resistive to heat and humidity associated with food transport and is portable so that it can be attached and detached from a portable delivery container. Preferably, the enunciating device weights less than 0.5 pound and more preferably less than three ounces.

BRIEF DESCRIPTION OF THE DRAWINGS

FIG. 9 is an exploded perspective view of a preferred embodiment of the heater of the invention.

FIG. 10 is a perspective view of a preferred embodiment of a thermostat and fuse assembly of the invention provided in FIG. 9.

FIG. 23 is an exemplary electronic schematic diagram according to the principles of the invention.

DETAILED DESCRIPTION OF THE PREFERRED EMBODIMENT

With reference now to the various figures in which identical elements are identically numbered throughout, a description of the preferred embodiment of the present invention will now be provided. The present invention will be described with reference to a delivery apparatus for food products. In particular, the present invention will be described with reference to a pizza delivery bag for transporting pizzas. It is customary to place cooked pizza in individual cardboard boxes. While the invention is being described in the context of a preferred embodiment, it will be appreciated that the invention can be used in a wide variety of applications for storing and/or transporting articles where it is desired to maintain the articles at an elevated temperature relative to ambient temperature.

Figure 1:
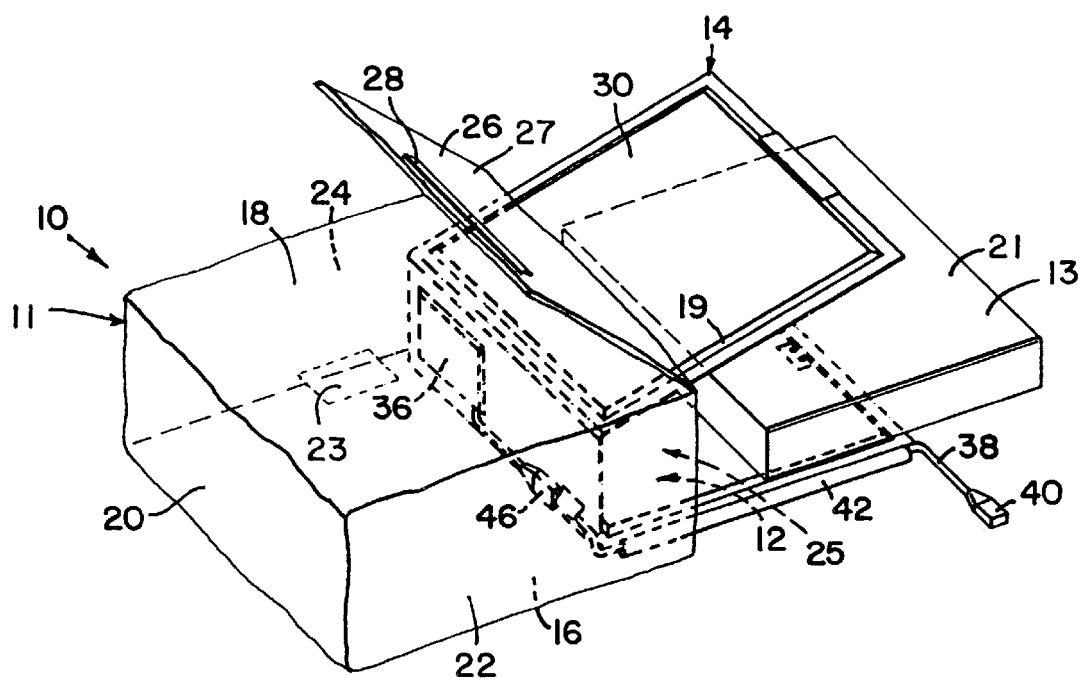
FIG. 1 is a perspective illustration of the delivery apparatus according to the principles of the present invention along with a pizza box partially inserted into the delivery apparatus.

Now referring to FIG. 1, a container 10 having an interior area 12 is shown with a heater 14 partially inserted into the interior area 12. The container 10 can be any device having a plurality of walls forming an interior area 12. In a preferred embodiment of the container the walls of the container are insulated. The container 10 also includes an opening 25 constructed for movement of the article 13 in and out of the interior area 12. The interior area 12 can be a single compartment or it can be multiple compartments.

A preferred embodiment of the container 10 is shown in FIG. 1 as pizza bag 11. Pizza bag 11 includes bottom wall 18, top wall 16, back wall 20 and first and second sidewalls 22 and 24. The walls 16, 18, 20, 22 and 24 of pizza bag 11 are insulated walls.

The container 10 also includes a flap 26 for covering the opening 25. The flap 26 can be any device for covering the opening 25. The purpose of the flap 26 is to prevent heat from escaping from the interior area of the container 10. The flap 26 could be an extension of any combination of walls 16, 18, 20, 22 and 24. The extension of any of these walls would be constructed to substantially cover the opening 25. Alternatively, the flap 26 could be a separate piece that is fastened to the container 10 to cover the opening 25. While the flap 26 does not have to have a fastener, it is preferred. The flap 26 could be an extension of top wall 16 zippered to an extension of bottom wall 18, for example.

In a preferred embodiment the flap 26 is an extension 27 of top wall 16. The extension 27 is draped down over the opening 25 and is slightly longer in the vertical direction than the opening 25. The free end of the extension 27 wraps around to the bottom wall 18 and is attached to the bottom wall 18 with hook and loop fastener 28. A mating hook and loop fastener is provided on the bottom wall 18.

An article 13 is shown partially received by the container 10. The article 13 can be any item that needs to be heated or maintained at a temperature above ambient temperature. The article 13 could be a food item or it could be a non-food item. In the case of food, the article 13 could be the food itself without any packaging or it could be the food and its associated packaging. In a preferred embodiment, the article 13 is a pizza box 21 including a pizza inside the pizza box 21. The article 13 could also be two or more pizza boxes 21.

Figure 2:
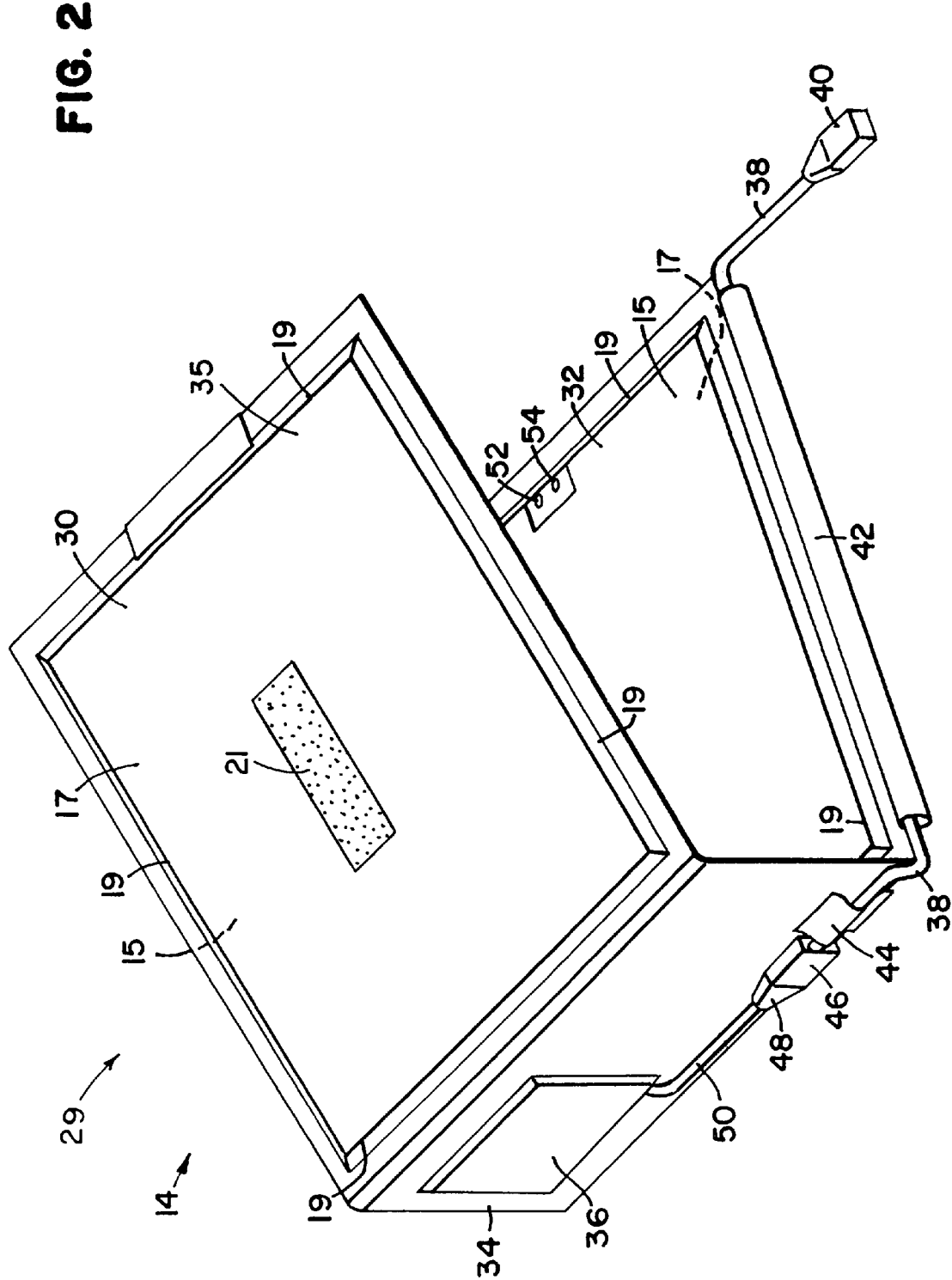
FIG. 2 is a perspective view of the heater according to the principles of the present invention.

FIG. 2 shows the heater 14 in the absence of the bag 11. Heater 14 is any device that releases heat energy. Heater 14 can come in many different configurations. A preferred embodiment of the heater 14 is a "wrap heater". A heater can be called a wrap heater when is wraps an article to be kept warm. That is, it wraps or heats at least two sides of an article to be kept warm. An exemplary wrap heater is described in U.S. application Ser. No. 09/267,182 which is assigned to Vesture Corporation the assignee of the above-identified application and which is hereby incorporated herein by reference. FIG. 2 shows a preferred embodiment of the heater 14, which is wrap heater 29.

Wrap heater 29 includes a cover 35. The cover includes anything that covers the heating grid and, if present, the heat sink of the heater 14. The cover can be a number of things including but not limited to a bag with a single compartment for receiving the heating grid and heat sink. The cover can be a hard-shell container.

In a preferred embodiment, the cover 35 of the wrap heater 29 has a first heating sleeve 30 and a second heating sleeve 32. An extension 34 is provided connecting the first heating sleeve 30 to the second heating sleeve 32. The wrap heater 29 is provided for heating a food product such that the first heating sleeve 30 is on one side of the food product and the second heating sleeve 32 is on the other side of the food product. The first and second heating sleeves 30 and 32 and the extension 34 are preferably made of a 210 to 400 denier nylon.

Each of the first heating sleeve 30 and second heating sleeve 32 include an inside surface 15 and an outside surface 17. The inside surface 15 provides a surface which is generally the closest surface of the wrap heater 29 to the article being heated. The outer surface 17 provides a surface that is closest to the bag 11 in which the wrap heater 29 is provided. The inside surface 15 and the outer surface 17 are preferably attached together along their edges 19 to contain the internal components and to prevent foreign matter from entering into the internal components of the heater 14. Preferably, the inside surface 15 and the outer surface 17 are sewn together along their edges 19. A hook and loop fastener 21 is sewn to the outer surface 17 of the receiving sleeves 30 and 32. A hook and loop fastener is also sewn to the pocket side of the top wall 16. The first hook and loop fastener 21 can be easily fastened to the hook and loop fastener 23 on the container thereby holding the wrap heater 29 in the interior area 12 of the bag 11. An identical system of hook and loop fasteners can be used to attach the outside surface 17 of the second receiving sleeve 32 to the pocket side of the bottom wall 16 of the bag 11.

The power cord 38 is adapted to be plugged into a power source with plug 40. The power source may be an alternating current source such as a wall outlet or it may be any other power source including a direct current power source. The power cord 38 is attached to the wrap heater 29 via a sleeve 42 that is stitched to the second heating sleeve 32. The sleeve 42 is preferably of large enough diameter such that the plug 46 can be pulled through the sleeve for easy removal from the wrap heater 29. The power cord 38 rounds a corner of the wrap heater 29 and travels along the extension 34. A sleeve 44 holds the power cord 38 to the extension 34. The sleeve 44 is preferably attached to the extension with a fastener such as a hook and loop fastener so that cord 38 and plug 46 can easily be removed from the wrap heater 29. A female plug 46 and the male plug 48 connect the cord 38 to cord 50. The purpose of the plugs 46 and 48 are to allow for replacement of the cord 38 along with plugs 46 and 40 without having to replace the entire wrap heater 29. Additionally, the ability to remove cord 38 with associated plugs 40 and 46 allows for easy replacement with different cords and plugs that can be used in countries with different power sources.

Cord 50 is connected to the electronics residing in a box 64 (shown in FIG. 3) that resides in sleeve 36. The wrap heater 29 includes the controller sleeve 36 in which a controller or a portion of a controller (not shown in FIG. 2) may be placed. Sleeve 36 is accessible from the food product receiving area of the bag 11 via an opening that is normally secured shut with a hook and loop fastener.

First and second light sources 52 and 54 are shown attached to the second heating sleeve 32. The light sources 52 and 54 are attached to the second heating sleeve 32 via grommets (not shown).

Figure 3:
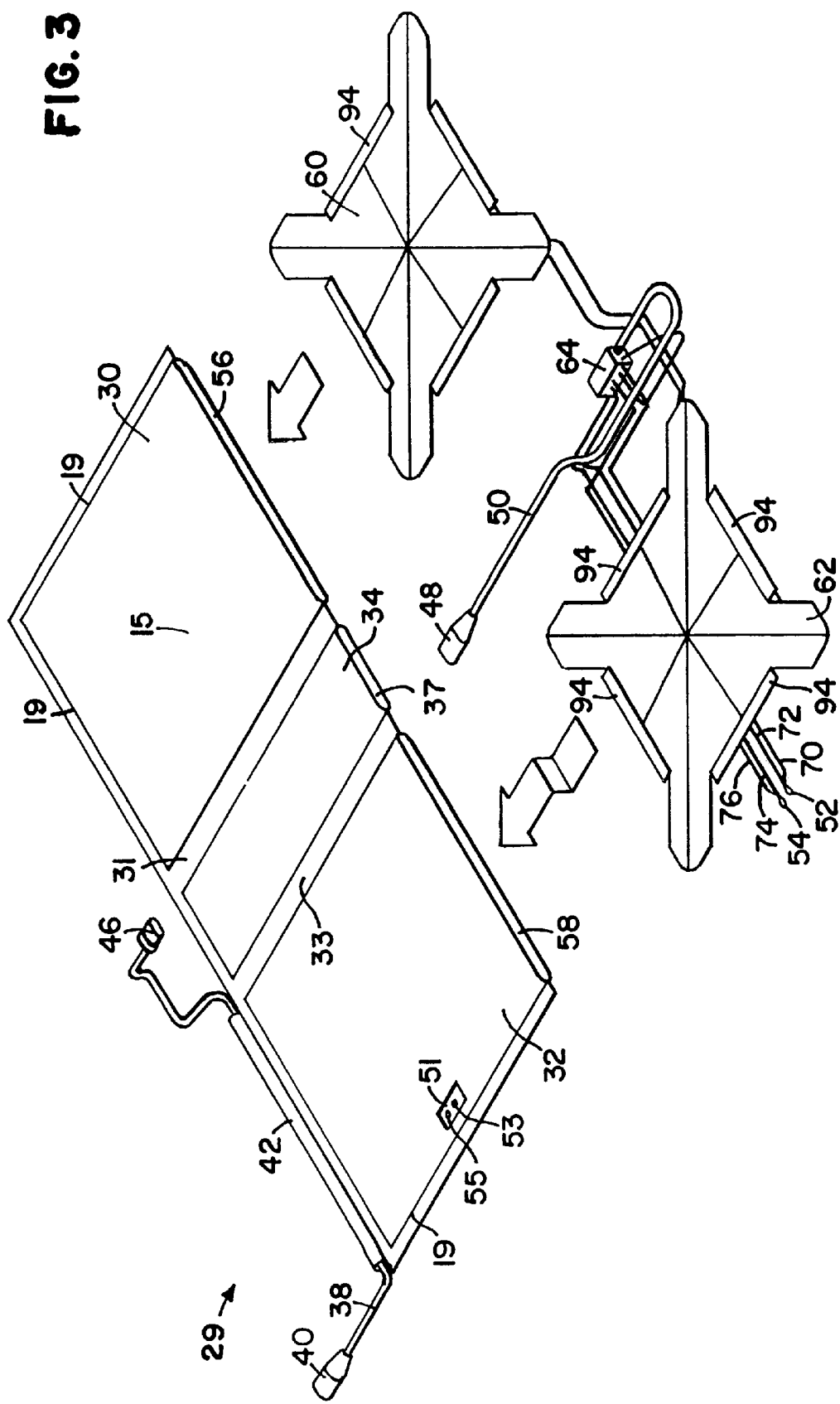
FIG. 3 is a sectional view of the heater according to the principles of the present invention.

FIG. 3 shows more detail of the wrap heater 29 of FIG. 2. In FIG. 3 the wrap heater 29 is laid open such that first heating sleeve 30, second heating sleeve 32 and extension 34 are in the same plane. The first heating sleeve 30 defines a pocket 56 and the second heating sleeve defines a pocket 58. In the normal operation of the wrap heater 29, assemblies 60 and 62 are located in the pockets 56 and 58 respectively. In normal operation the pockets 56 and 58 would be sewn shut with the assemblies 60 and 62 located inside the pockets 56 and 58 respectively so that the assemblies 60 and 62 cannot slide out. In FIG. 3 the assemblies 60 and 62 are shown outside the pockets 56 and 58 for ease of illustration.

The first heating sleeve 30 is separated from the extension 34 by a first crease 31. The second heating sleeve 32 is separated from the extension 34 by a second crease 33. The creases 30 and 32 allow the wrap heater 10 to generally wrap an article for heating. In the case of a pizza provided in a pizza box, the first sleeve 30 can be provided covering the top of the pizza box, and the second heating sleeve 32 can be provided underneath the pizza box. The creases 31 and 33 also result in a pocket 57 located in the extension 34. Pocket 57 preferably contains a layer of polyester insulation. A layer of polyester insulation is also placed in the pockets 56 and 58 between the respective assemblies 60 and 62 and respective outer surfaces 17. This insulation further prevents heat loss to the outside environment.

Power cord 50 that provides electrical power to the wrap heater 29 is connected to the electronics in box 64. The box 64 is preferably an aluminum box with ventilation holes. The box 64 protects and supports a circuit board contained within box 64. The circuit board contained in box 64 includes electrical components and circuitry that make up a part of the controller. The term "controller" is not limited to the electronics located in the box 64 but could also include other components such as sensors and switches that will be described below. Furthermore, the term "controller" does not require all of the elements in the box 64 but could comprise a smaller subset of elements.

While a brief description of the electrical connections is provided here in conjunction with FIG. 3, a more detailed discussion is set forth below in the discussion of FIG. 5. Two wires 70 and 72 connect the first light source 52 to the electronics in box 64. Likewise, two wires 74 and 76 connect the second light source 54 to the electronics in the box 64. The wires 70, 72, 74, and 76 can travel along the bottom of assembly 62 between the assembly 62 and the outer surface 17. Preferably the wires 70, 72, 74 and 76 travel between the assembly 62 and the inside surface 15. When the assemblies 60 and 62 are placed inside the pockets 56 and 58, the light sources 52 and 54 can be seen through the window 51 at holes 53 and 55. The window 51 is preferably a clear flexible plastic material that is sewn to the inside surface 15. The light sources are preferably light emitting diodes (LED) with the first light source 52 being a red LED and the second light source 54 being a green LED. Each light source 52 and 54 has at least a first state in which a first level of light intensity is released and a second state in which a second level of light intensity is released. In a preferred embodiment, the first state of both light sources 52 and 54 is equivalent to the LED being turned on such that it releases light. In a preferred embodiment, the second state of both light sources 52 and 54 is equivalent to the LED being turned off such that no light is released.

Figure 4:
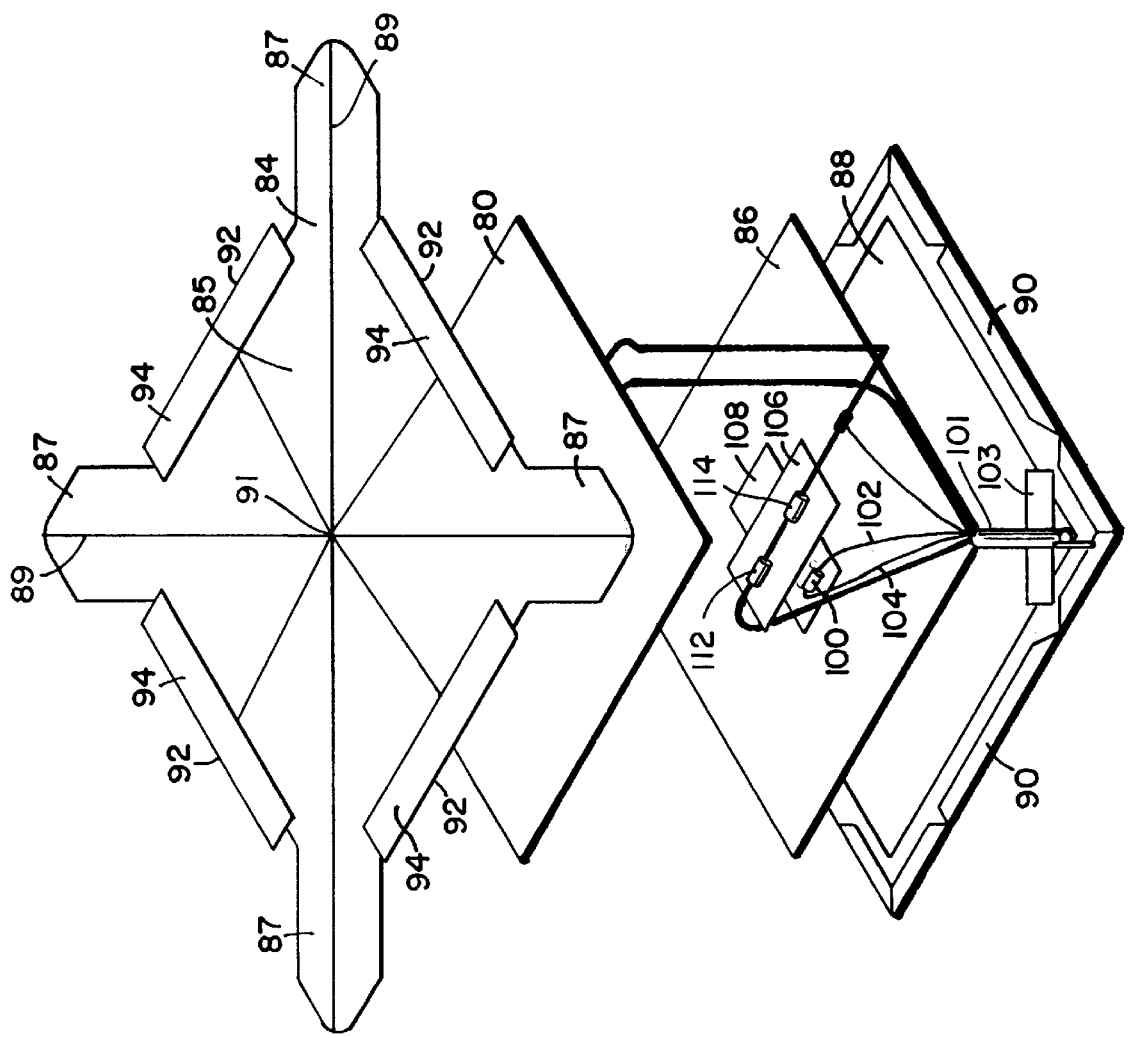
FIG. 4 is an exploded view of the assembly of the heater according to the principles of the present invention.

FIG. 4 illustrates an exploded view of the elements of the assembly 62. Note that in the preferred embodiment the assembly 60 is very similar to assembly 62. Therefore, the discussion of assembly 62 below can be applied to assembly 60.

Assembly 62 includes a heating grid 80 that is preferably a mica high watt density heating grid. For purposes of the present invention the term "high watt density heating grid" defines a heating grid with a watt density equal to or greater than 2.5 watts per square inch. In a preferred embodiment the heating grid 80 is a 300 watt mica heating grid with an area of 100 square inches (10 inch by 10 inch square) resulting in 3.0 watts per square inch. The heating grid can be constructed of other materials that can handle the high watt density required for this invention.

Assembly 62 also includes a heat sink 84 that is in thermally conductive contact with the heating grid 80 so that a portion of the heat generated by the heating grid 80 flows into the heat sink 84. The heat energy in the heat sink 84 is then released for heating the article such as the pizza. The heat sink should have a phase change temperature of at least 300° F. It is desired that the heat sink have a specific heat on the order of the specific heat of polycarbonate or higher. It is also a design consideration to have a heat sink with a relatively low density. For example, a number of metals are too dense and thus would result in a very heavy delivery apparatus if used as the heat sink. Some exemplary materials that might be used as a heat sink are aluminum and phnalic resins. The heat sink 84 is preferably made of polycarbonate.

The heat sink 84 can be any shape including a square, rectangle, circle or any other shape. The polycarbonate heat sink 84 is preferably in the shape shown in FIG. 4. This preferred shape of the polycarbonate heat sink 84 is essentially a square central portion 85 with four wings 87, one wing extending from each corner of the square central portion. The advantage of the wings 87 is that they extend over the corners of the cardboard box that holds the pizza. The corners of the cardboard box are the strongest part of the cardboard box. Therefore, the wings 87 in conjunction with the stronger corners of the cardboard box prevent the heat sink from pressing against the central part of the box. Pressure on the central part of the box would cause pressure into the pizza itself including the cheese resulting in a less desirable food product.

The ridges 89 are depressed as compared to the rest of the polycarbonate heat sink 84 and these ridges 89 become further depressed as they slope toward the center 91 of the polycarbonate heat sink 84. That is, the center 91 of the polycarbonate heat sink 84 is closer to the heating grid than the rest of the polycarbonate heat sink 84. This depression in the heat sink 84 accounts for stresses caused by thermal expansion and contraction of the heat sink 84. The depression prevents materials from warping and therefore restricting the space in the cover 35.

The layer 86 directs the heat energy from the heating grid 80 toward the polycarbonate heat sink 84. The layer 86 is preferably two layers of fiberglass matting, such as maniglass material, each having dimensions the same as the heating grid 80 such as 10 inches by 10 inches. Each of the two maniglass layers is preferably about one eighth of an inch thick. An advantage of using maniglass for layer 86 is that maniglass is capable of withstanding high temperatures without emitting unpleasant odors.

The layer 88 is a structural element that holds all the elements of the assembly 62 together. Preferably the layer 88 is a sheet of aluminum. The dimensions of the layer 88 are generally the same as the square formed by the central portion of the heat sink 84 that is 12 inches long by 12 inches wide. The layer 88 further includes four flaps 90 that are also preferably made of aluminum. The flaps 90 extend beyond the square shape of the layer 88 and are made to wrap around the outer edge 92 of the heat sink 84 so that the heat sink 84 and the layer 88 cover and hold together all the elements of the assembly 62. In FIG. 4, adhesive tape 94 is shown covering the outer edges 92 of the heat sink 84. In the final assembly 62, the flap 90 wraps around the outer edge 92 and then the tape 94 is adhesively attached to cover the flap 90 and a portion of the heat sink 84 as an additional means for keeping the flaps 90 from pulling apart from the heat sink 84. The tape 94 is preferably a 7 inch strip of TYCO 225 FR tape.

A temperature sensor 100 is electrically connected to the box 64 by wires 102 and 104. The temperature sensor 100 is any device that is capable of measuring the temperature of the heating grid such that the temperature information can be utilized by a controller.

The temperature sensor 100 is preferably a thermister. The thermister is preferably rated between 3 kilo ohms and 100 kilo ohms. A preferred embodiment utilizes a 10 kilo ohm thermister. In a preferred embodiment there is no sensor in the assembly 60. A thermister 100 in the assembly 62 is sufficient to provide the requisite temperature feedback for proper control of the wrap heater 29. However, there could be a sensor in the assembly 60. The thermister 100 is attached to the heating grid 80 by tape 106 and 108. Fuses 112 and 114 are in series and are also attached to the heating grid 80 by the tape 106 and 108. The wires 102, 104 and others in the assembly 62 lead out of the assembly 62 through heat shrink tube 101 that is taped to the polycarbonate heat sink 84 with tape 103. Tape 103 is preferably TYCO 225 FR tape.

It should be appreciated that while a preferred embodiment of the heater includes heating grids in both sleeves as shown in wrap heater 29, the heater 14 of the invention can be provided so that only one sleeve provides heating. Furthermore, it should be appreciated that the amount of heating provided by both sleeves can vary. That is, the first sleeve can provide greater heating than the second sleeve, or vice versa.

Figure 5:
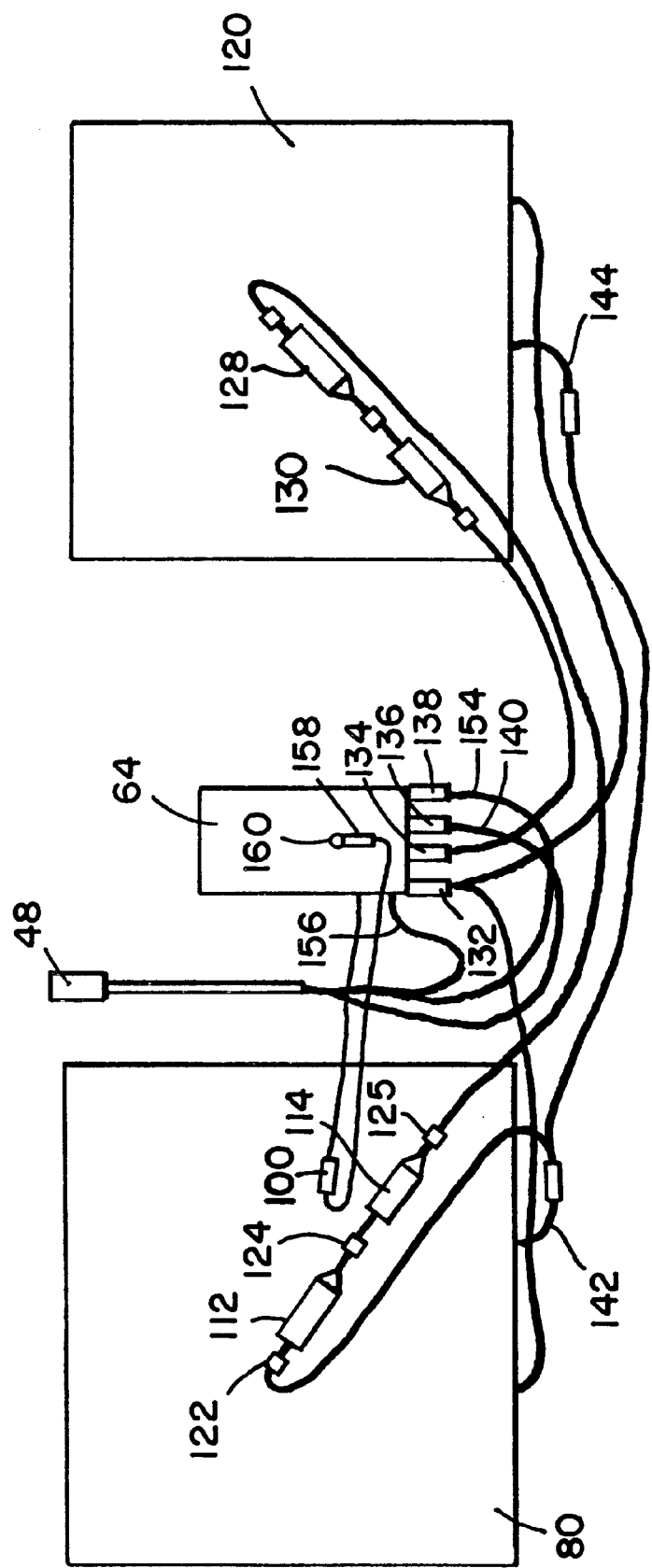
FIG. 5 is a wiring diagram of the heater according to the principles of the present invention.

FIG. 5 is a wiring diagram of a preferred embodiment of the invention. The heating grids 80 and 120 of assemblies 62 and 60 respectively are shown. The box 64 that contains electronics to be discussed further below is also shown.

In operation, thermister 100, thermal fuse 112 and thermal fuse 114 are attached to the heating grid 80 with tape (not shown). The thermal fuse 112 is preferably a 192° C. thermal fuse. The thermal fuse 114 is preferably a 184° C. thermal fuse. Exemplary thermal fuses 112 and 114 are thermal fuses made by Thermodisk Corporation. However, other fuses may be used including thermal fuses having different temperature set points and made by different manufacturers. Two fuses of slightly different temperature set points are used as an extra precaution. If one of the thermal fuses malfunctions or is defective, the other fuse provides the necessary protection against overheating. By using fuses with different temperature set points, it can be guaranteed that the two fuses 112 and 114 were manufactured in different batches, thereby reducing the likelihood of a defect in both.

The connectors 122, 124 and 126 connect the fuses into the circuit. Connectors 122, 124 and 126 are preferably crimp style connectors such as Stacon crimp connectors.

In a preferred embodiment, there is no thermister on the heating grid 120. However, thermal fuses 128 and 130 are connected to heating grid 120 in the same fashion as the thermal fuses 112 and 114 on heating grid 80. Thermal fuse 128 is preferably a 192° C. fuse and thermal fuse 130 is preferably a 184° C. fuse. Each of the thermal fuses 112, 114, 128 and 130 is preferably wrapped in either a polyamide film such as Kapton tape by E. I. Du Pont De Nemours and Company or fiberglass sleeving material. The polyamide tape or fiberglass sleeving material is used for electrical insulation.

From FIG. 5 it can be seen that the fuses 112 and 114 attached to the heating grid 80 are in series with the fuses 128 and 130 attached to the heating grid 120. Therefore, if any fuse is blown, power to both heating grids 80 and 120 is shut down.

Terminals 132, 134, 136 and 138 are connected to the box 64. Power comes in via wire 140 to terminal 136. Power flows out of the box 64 at terminal 134. Wires 142 and 144 carry power to the mica heating grids 80 and 120. The blocks 146 and 148 each represent a butt splice. Neutral wires 150 and 152 exit the mica heating grids 80 and 120 respectively and return to terminal 132. Terminal 138 is connected to neutral wire 154 that is the neutral return wire to plug 48. Wire 156 is the ground wire and is attached to the aluminum box 64 with a fork terminal 158 and a screw 160.

Figure 6:
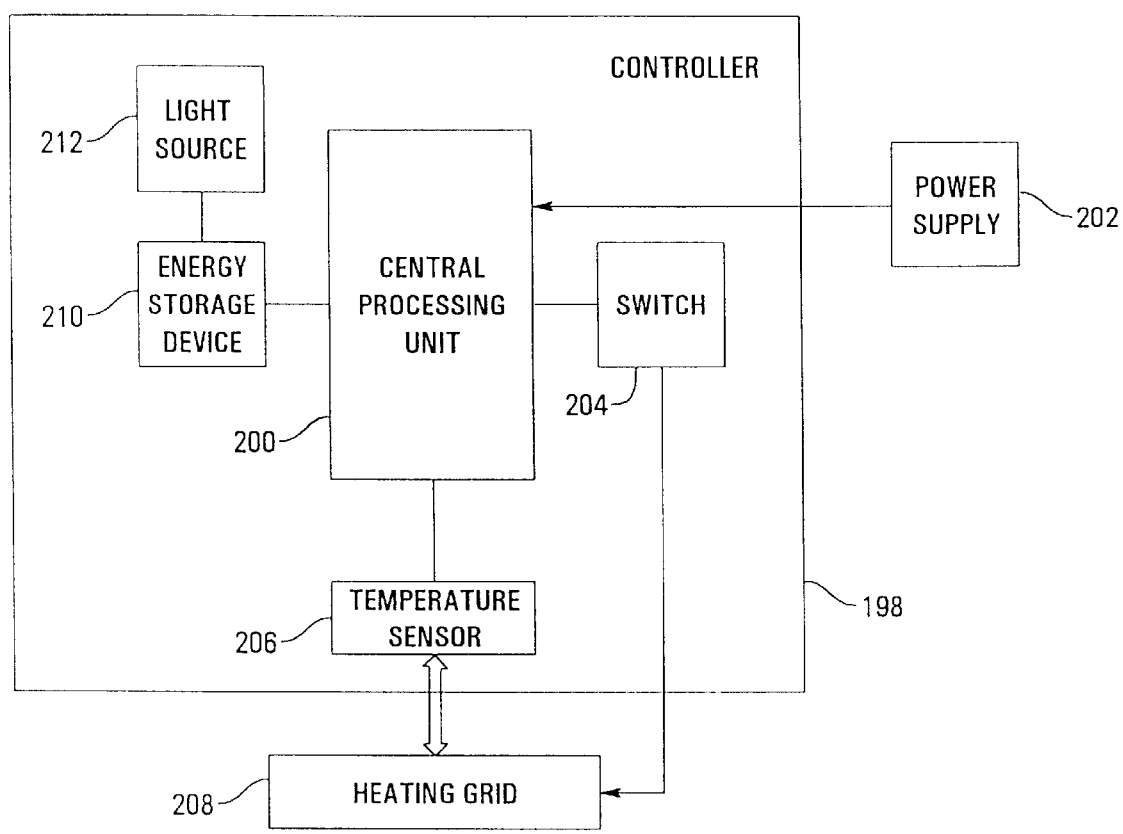
FIG. 6 is a block diagram of a controller according to the principles of the present invention.

FIG. 6 is a block diagram of a preferred embodiment of a controller of the invention and its interaction with a heating grid and power source. It should be appreciated that the term "controller" as used in this application could mean the combination of a number of elements and that not all the elements included in the controller 198 of FIG. 6 are required to be in a "controller". The controller 198 in FIG. 6 is but one embodiment of the term "controller". Note also that FIG. 7, discussed below, is an alternate embodiment of a controller in accordance with the present invention.

The controller 198 includes a central processing unit 200 that receives power from the power source 202. The central processing unit 200 could be any electronic control device capable of receiving information from a sensor and determining what signals to provide to one or more other electronic elements to perform some task. As an example only, the other electronic element could be a switch that the central processing unit 200 directs to turn off the electrical power from the power source 202 to the heating grid 208. As a further example only, the other element could be an energy storage device that the central processing unit 200 directs to energize a light source. A preferred embodiment of the central processing unit 200 is a microprocessor located on the circuit board in the box 64.

The central processing unit is electrically connected to a switch 204. Switch 204 may be any device capable of receiving a signal from the central processing unit to allow or disallow energy to flow from the power source 208 to the heating grid 208. The switch 204 must also be capable of then performing the operation of allowing or preventing energy to flow from the power source 208 to the heating grid 208. A preferred embodiment of switch 204 comprises solid-state electronics such as one or more transistors.

The temperature sensor 206 is in thermal communication with the heating grid 208. The temperature sensor 206 is also in electrical communication with the central processing unit 200. The temperature sensor is any sensor capable of communicating the temperature of the heating grid 208 to another device. For example, the temperature sensor 206 communicates the temperature of the heating grid 208 to the central processing unit 200. As stated above, in a preferred embodiment the temperature sensor 206 is a thermister.

Energy storage device 210 is electrically connected to the light source 212 for providing energy to the light source 212 even when the heater is not connected to the power source 202. Energy storage device 210 is also in electrical communication with the central processing unit 200. Any device capable of storing energy and releasing that energy in the form of electricity qualifies as an energy storage device 210. In a preferred embodiment the energy storage device 210 provides energy to the light source 212 upon command by the central processing unit 200. The energy storage device 210 is preferably a set of capacitors provided on the circuit board in the box 64. An alternative embodiment of the energy storage device 210 would be a rechargeable battery. The presence of energy storage device 210 attached to the delivery apparatus for powering the light sources is very advantageous in that the indicating lights can provide information even after the delivery apparatus is disconnected from the power source.

Figure 7:
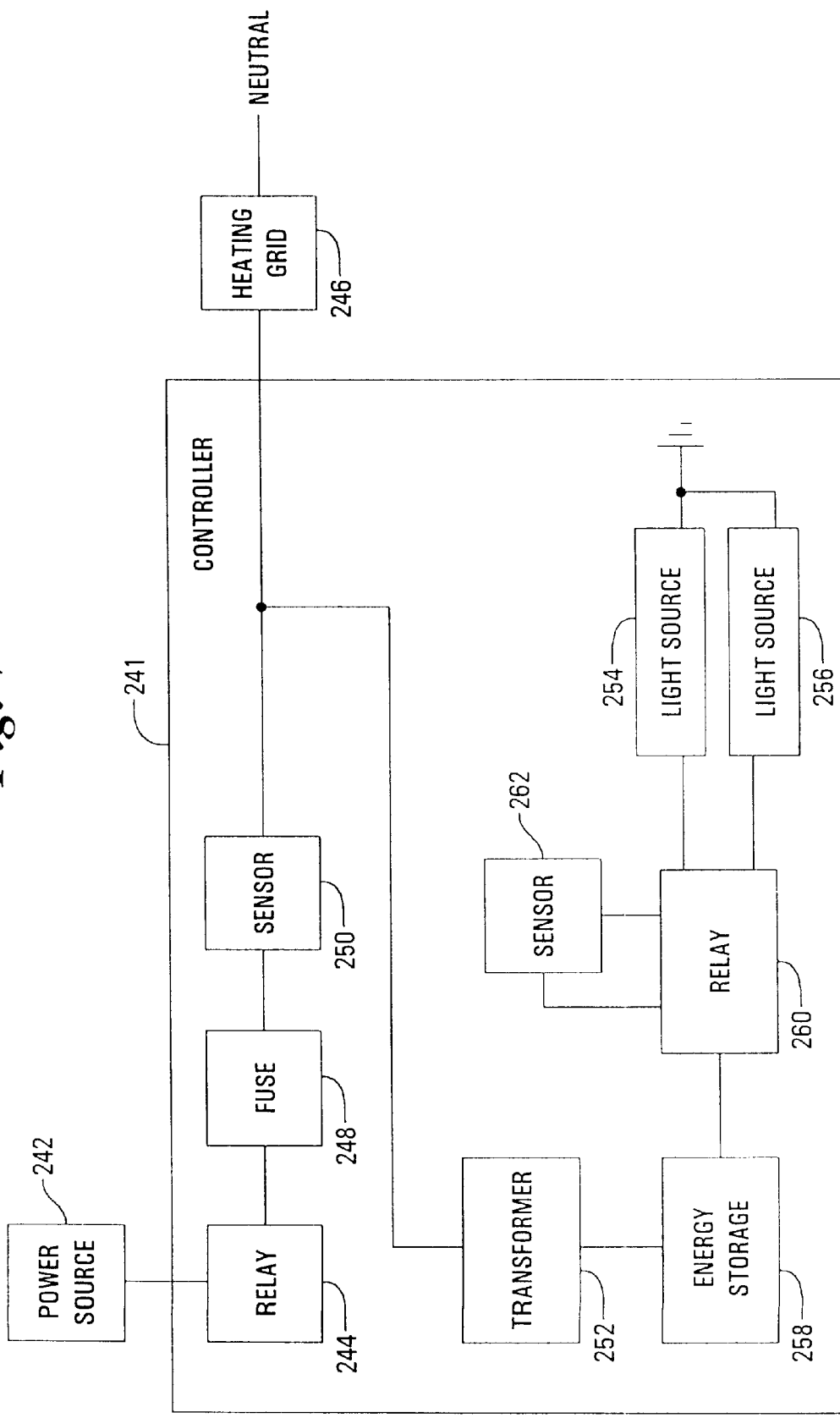
FIG. 7 is a block diagram of an alternative controller according to the principles of the present invention.

FIG. 7 is a block diagram of an alternate embodiment of a controller of the present invention. The controller 241 is shown. A power source 242 is connected to a relay 244. The relay 244 is any device capable of allowing energy to flow through for a specified period of time and then preventing energy to flow through after that specified time has passed. The relay 244 is preferably a timer control latching relay. The relay 244 allows a predetermined amount of energy to go to the heating grid 246. In a preferred embodiment the timer control latching relay is set for 2.5 minutes before the energy to the heating grid is interrupted.

The fuse 248 is for security to prevent overheating of the heating grid 246. In a preferred embodiment, the fuse 248 is a 184° C. thermal fuse.

The sensor 250 is also a security component that prevents the temperature of the heating grid from going over a particular temperature. Sensor 250 is any device that is capable of opening the circuit when a particular temperature is reached. In a preferred embodiment, the sensor 250 is a thermostat. In a more preferred embodiment, the sensor 250 is a normally closed thermostat that opens the circuit at 140° C. The thermostat 250 is in thermal communication with the heating grid 246. If the temperature of the heating grid 246 goes over 140° C. the thermostat 250 prevents further energy from passing to the heating grid 246.

Heating grid 246 is preferably a mica heating grid but could be other types of heating grids as discussed above with respect to other embodiments. In a preferred embodiment heating grid 246 is capable of high watt densities of greater than 2.5 watts per square inch.

Control of the light sources 254 and 256 is shown in the rest of FIG. 7. Transformer 252 reduces the voltage from source voltage to a voltage appropriate for the light sources. In a preferred embodiment, the power source is at 120 volts and the transformer reduces the voltage to 5 volts.

The transformed down power then passes through the energy storage device 258. Relay 260 is any device which can receive a signal from a thermostat or other sensor and switch one or more lights on and off according to a particular protocol that results in providing information to the user regarding the status of the heater. In a preferred embodiment the relay 260 is a single pole double throw thermostat driven relay.

The relay 260 is driven by sensor 262. Sensor 262 is in thermal communication with the heating grid 246. Sensor 262 is any device capable of determining the temperature of the heating grid 246 and communicating that temperature information on to the relay 260. In a preferred embodiment the sensor 262 is a normally open 66° C. thermostat. The normally open 66° C. thermostat is open when the temperature is below 66° C. When the temperature of the heating grid 246 goes above 66° C. the thermostat 262 closes the circuit.

The relay 260 drives light sources 254 and 256 according to the signals the relay 260 receives from the thermostat. The light sources 254 and 256 are preferably a red LED and a green LED. It should be appreciated that it is within the scope of this invention to have only one light source or to have more than two light sources. The choice of how many light sources depends on what information is desired to provide to the user.

The operation of the device in FIG. 7 is now described. The relay 244 allows power to pass through the relay 244 for a set period of time, preferably about 2.5 minutes. During the 2.5 minutes the heating grid is charging and therefore the temperature of the heating grid 246 is rising. If the temperature goes above 140° C., the thermostat 250 opens the circuit to prevent the heating grid 246 from receiving further electrical energy. As a precaution the fuse 248 will also open the circuit if the temperature of the heating grid rises above 184° C.

The 120 volts from the power source 242 is transformed to 5 volts by transformer 252. The energy storage device is charged during the approximately 2.5 minutes that the timer allows charging of the heating grid 246.

When the relay 244 opens the circuit after 2.5 minutes, the heating grid 246 gradually cools down. The heating grid 246 will not heat up again until the user restarts the cycle by resetting the relay 244.

Before charging of the heating grid begins, the red and green LED's are off. When the charging is proceeding and the temperature of the heating grid 246 is below the 66° C.

set point of the thermostat 262, the relay 260 causes the red light to be on. When the temperature of the heating grid exceeds 66° C., the relay 260 causes the red light to go off and the green light to go on. When the temperature of the heating grid 246 drops below 66° C., the relay 260 causes the green LED to go off and the red LED to go on. At this stage, there is no power reaching the transformer 252 and so there is only a limited amount of energy available as stored in the energy storage device 258. After the energy in energy storage device 258 is expended, both light sources go off.

Figure 8:
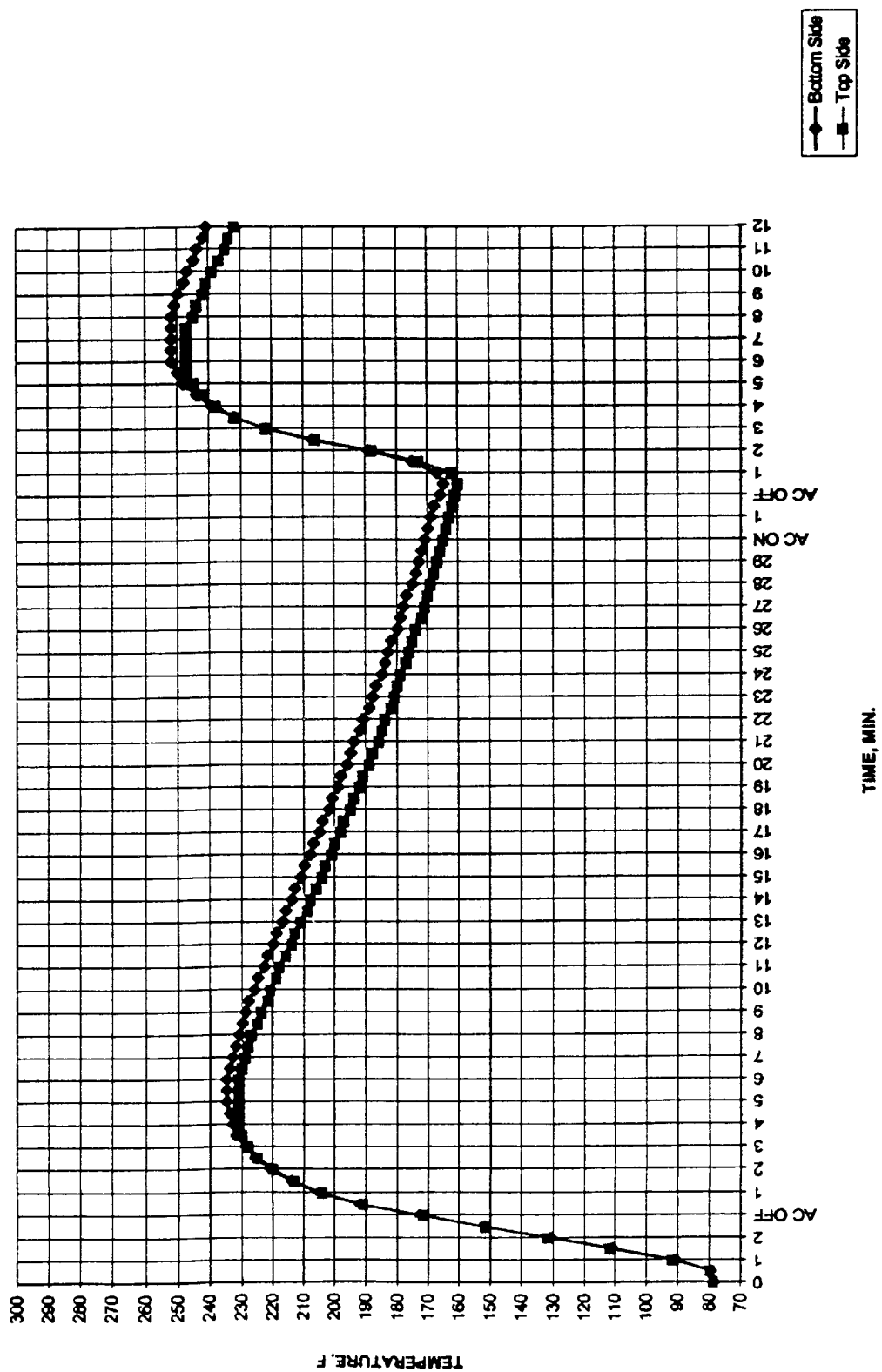
FIG. 8 is an exemplary temperature versus time chart showing one possible control scheme according to the principles of the present invention.

The control operation of the wrap heater 29 with respect to the embodiment shown in FIGS. 1–6 is now explained in conjunction with FIG. 8. FIG. 8 is a graph of temperature of the heating grids 80 and 120 versus time. This graph was generated from an experimental measurement of the preferred embodiment of the invention described above. The line in the graph using diamond shapes for data points is one possible temperature curve of the heating grid 80 and the line using square data points is one possible temperature curve of the heating grid 120. The graph of FIG. 8 is not intended to be limiting to the invention disclosed herein. Rather the graph of FIG. 8 is merely an example of a possible control scheme. The notations along the time axis for "AC OFF" and "AC ON" represent the time at which the power to the heating grids was turned off and on respectively.

In a preferred embodiment, the temperature of the heating grids 80 and 120 cycle from an initial temperature that is room temperature to a higher temperature and then the temperature is allowed to drop to a lower temperature while the power to the heating grid is turned off. Preferably this cycle from a higher temperature to a lower temperature will occur three times and then the controller directed by the microprocessor will turn the heating grids 80 and 120 off and leave them off until a user directs the heater to begin charging again. The user so directs the heater to begin charging again by unplugging the plug 48 from the power outlet and then plugging plug 48 back into the outlet. The shut off of power to the heater after three cycles is to prevent excessive use of electricity in the case when a heater is unintentionally left on for an extended period of time. Only one cycle from higher temperature to lower temperature is shown in FIG. 8.

As can be seen, each cycle from AC OFF to AC ON is 30 minutes. In a preferred use of the invention the wrap heater 29 is removed from the power source at the same time the power is turned off (AC OFF). Then the heating grids continue to heat up to approximately 240° F. The polycarbonate heat sink 84 then releases heat energy for an extended period of time. Thirty minutes after the AC is turned off the temperature of the heating grids is approximately 170° F. Using heating grids 80 and 120 with a watt density of 3.0 watts per square inch, it takes 2.5 minutes from power on to power off to accomplish a higher or peak temperature of 240° F. The difference between the peak temperature and the lower temperature is referred to as the "hysteresis". In the example provided, the hysteresis is 240°–170°=70°.

It is noted that the use of a high watt density heating grid in the prior art devices would present significant problems. Prior art delivery apparatus use thermostats that are not capable of providing a large hysteresis. Thermostats typically provide a hysteresis of 2–10°. With a high watt density heating grid of 3.0 watts per square inch, the overshoot would be much less controllable and there would certainly be a high risk that the thermostat would fail to perform consistently to prevent heat sink degradation. For example, in U.S. Pat. No. 5,880,435 entitled "Food Delivery Container", the replacement of the heating element with the high watt density heating grid of the present invention would result in a high risk of melt down of the polyethylene material. The thermostat of U.S. Pat. No. 5,880,435 would be in danger of failing because the large current flow that is required for a high watt density heating grid would likely cause arching at the bimetallic contact points. Additionally, high watt density heating grid would cause unacceptable overshoot by the thermostat when the heater is powered up.

A preferred method of using the delivery apparatus in accordance with the principles of this invention will now be described. The wrap heater 29 is placed in the pizza bag 11 and attached to the pizza bag 11 as discussed above. If it is desirable to clean the pizza bag 11 or wrap heater 29, then the heater can be removed from the interior area 12 for cleaning. The heater is then charged with thermal energy by connecting the heater to the power source. In a preferred embodiment, the charging step is accomplished by plugging the plug 48 into a wall outlet. Alternatively, the heater can be electrically connected to a battery or other power source. A further embodiment could involve a manual or other type of switch that can be activated while the plug 48 is plugged into the wall outlet. Activation of such a switch would result in electrical energy flowing to the heater from the power source.

The electrical resistance heating of the heating grid then causes the heating grid to rise to a temperature of approximately 240° F. within approximately 2.5 minutes. A food product such as pizza or any other food item for which it is desirable to keep warm is placed in the food product receiving area 12. The food product could be hot sandwiches, pizza, casseroles or other food items. The heater is disconnected from the power source. The article such as a food product is then delivered in the delivery apparatus. The delivery step is typically carried out by placing the delivery apparatus in a vehicle such as a car or truck and driving the vehicle to the customers' home or business. An advantage of the present invention is that the delivery apparatus does not need to be plugged into a power source such as a cigarette lighter in the vehicle during transport to the customer.

It is also noted that in accordance with the embodiment shown in FIG. 6, the pizza or other food product can be placed in the delivery apparatus after more than 2.5 minutes from the beginning of the charging step. For example, a pizza bag 11 containing a wrap heater 29 may be left plugged into the power source for up to about 1.5 hours before the controller allows the pizza bag 11 to cool to room temperature. Therefore an exemplary use is to leave the bag 11 and wrap heater 29 plugged into the power source for up to about one hour and then place the pizza into the food receiving area, unplug the heater and transport the entire delivery apparatus to the customer. Alternatively, the food product may be placed in the delivery apparatus before the charging step. This alternative does not result in a cold food product because of the short amount of time (2.5 minutes) that it takes to charge the heater.

An alternative embodiment of a heater 298 of the present invention is shown in exploded perspective view in FIG. 9. This heater 298 is placed inside a pizza delivery bag (not shown). The embodiment shown in FIG. 9 utilizes a polycarbonate heat sink in conjunction with a heating grid that is not of the high watt density category. This alternative embodiment utilizes a thermostat to control the temperature of the heating grid.

The heating grid of FIG. 9 comprises a 4.5 ohm wound wire 300 that is taped to a polycarbonate heat sink 302. The wound wire 300 has an output of 190 watts over a 12 inch by 12 inch heater. The resulting watt density is therefore approximately 1.3 watts per square inch. The wound wire 300 is attached to the polycarbonate heat sink 302 by a 9 inch by 14.75 inch piece of aluminum tape 303 that covers the central portion of the wound wire 300. Two 12.75 inch by 2 inch strips of aluminum tape 304 cover the ends of the wound wire 300 and assist in attaching the wound wire 300 to the polycarbonate heat sink 302. The male plug 306 is for connection to a typical wall outlet. The cord 308 connects plug 306 to female plug 308 that receives male plug 312. Cord 308 and associated plugs 306 and 310 may be removed from plug 312 and replaced with a different cord and plugs if it is desired to utilize a power source of different voltage requirements or to replace a worn cord or plug.

The power cord 314 includes ground wire 316 that is mounted to a ³⁄₁₆ inch ring tongue terminal 322 at the center of the polycarbonate heat sink. Wire 318 is the positive power wire and it leads to a thermostat 324 and thermal fuse 326 (shown in FIG. 10). Wire 320 is the returning neutral wire from the wound wire 300. Maniglass layers 330 and 332 are situated between the wound wire 300 and the injection molded hard-shell 334. At the other end of heater 298 is a hard-shell 336 which is constructed to mate with the hard-shell 334 to enclose the other components of the heater 298.

FIG. 10 shows the thermostat 324 and fuse 326 of the alternative embodiment shown in FIG. 9. Wire 318 is spliced to the thermal fuse 326 by a Panduit butt splice 328. The fuse 326 is in series electrical connection with thermostat 324 that is in series connection with wire 340.

When the heater 298 is assembled the hard-shell 334 is coupled to hard-shell 336 by welding. Different welding techniques may be utilized such as hot plate welding and ultrasonic welding. The hard-shells 334 is constructed of polypropylene filled with talc. The hard-shell 334 could also be polycarbonate or other materials with similar properties. Wire 314 passes between the two hard-shells 324 and 326 at the passage created by indentations 342 and 344.

Figure 11:
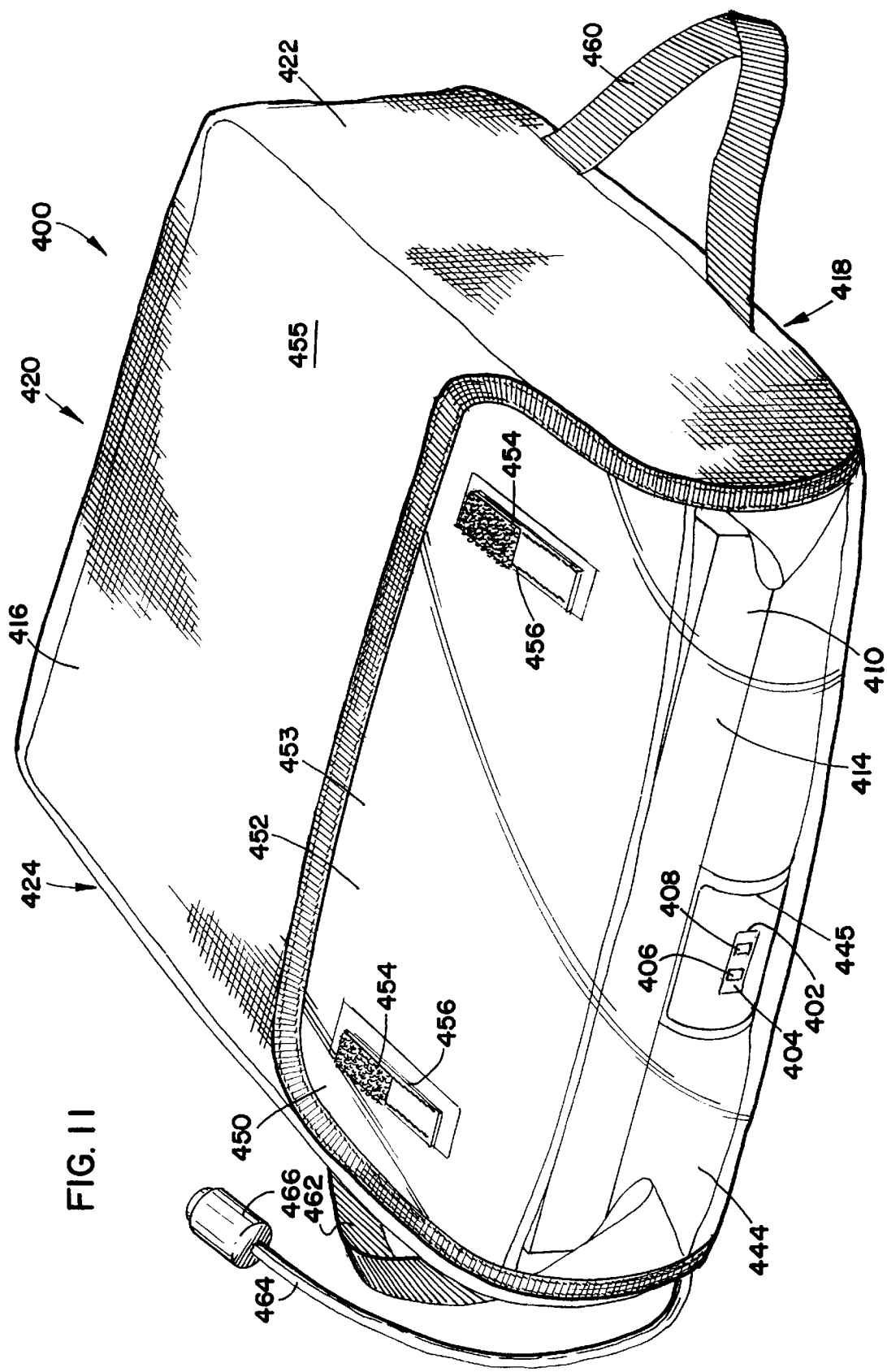
FIG. 11 is a perspective view of a pizza delivery bag that includes a temperature enunciating device according to the principles of the invention.
Figure 12:
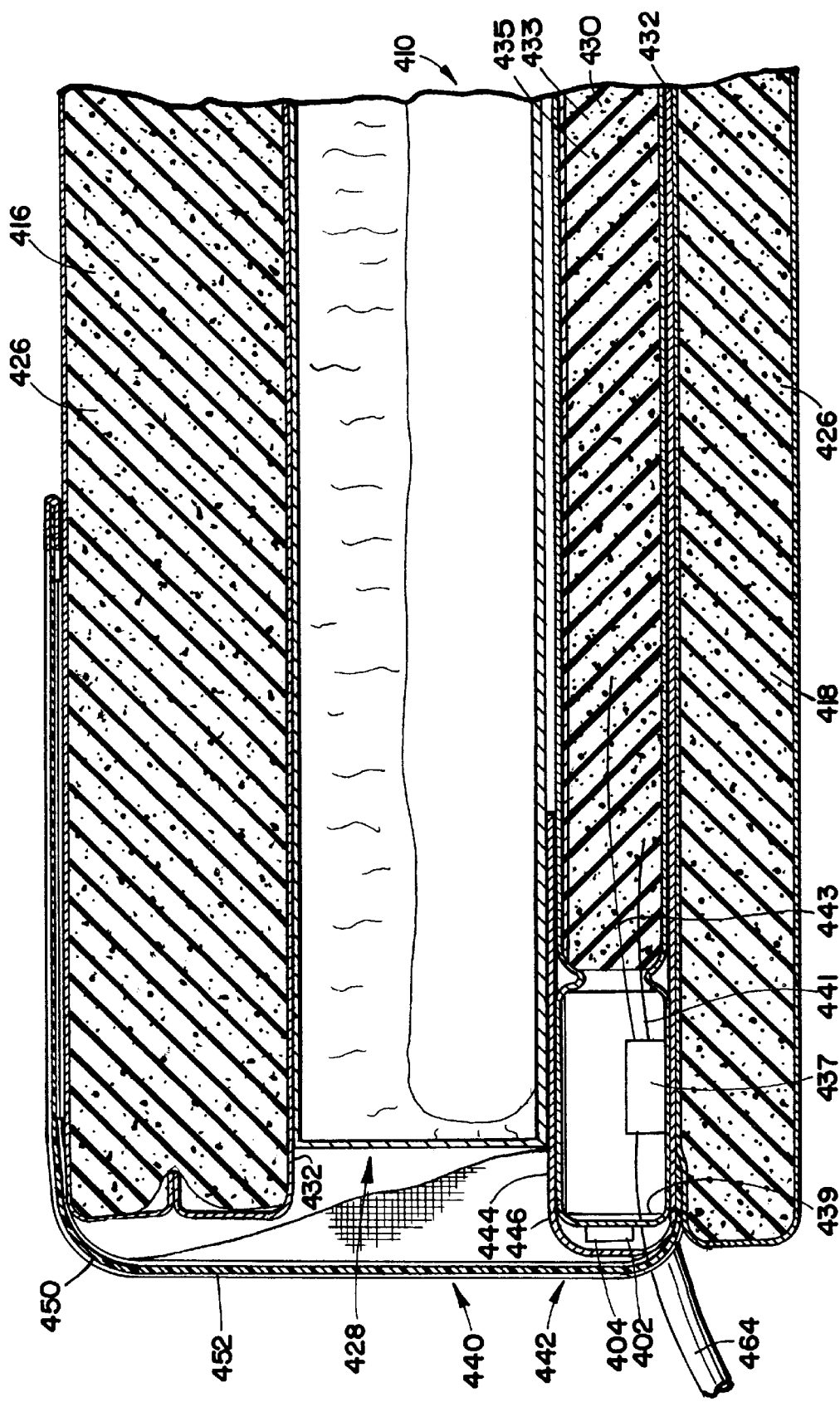
FIG. 12 is a sectional view of the pizza delivery bag of FIG. 11 taken along line 12—12.

Now referring to FIGS. 11–12, a pizza delivery bag according to the invention is shown at reference numeral 400. The pizza delivery bag includes an enunciating device 402. The enunciating device is an arrangement that provides a user or customer with desired information about the temperature conditions within the bag. The pizza delivery bag is a type of delivery apparatus according to the invention that can be used to transport and deliver various items or articles to be kept warm. Preferred items or articles to be kept warm include food such as pizza. Furthermore, the enunciating device can be used to display temperature or thermal conditions within the delivery apparatus and, if desired, provide control of the temperature or thermal conditions within the delivery apparatus. The delivery apparatus which includes an enunciating device can be referred to as a "smart bag" because of the informational display properties, and, if desired, the control properties exhibited by the apparatus.

The enunciating device allows a customer to have confidence that the food arriving in the delivery container is arriving at a desired thermal condition. In addition, the enunciating device provides an additional quality control measure to insure that the food product is delivered at a specified temperature. Accordingly, the enunciating device can be used to provide desired information about the thermal condition or temperature of the article provided within the container.

The enunciating device can be a visual enunciating device or an audio enunciating device. The enunciating device 402 is shown as a visual enunciating device 404. The visual enunciating device 404 is shown having a plurality of lights 406 and 408 that can function similar to light sources 254 and 256. Illumination of light 406 can indicate that the bag 400 is charging, and illumination of light 408 can indicate that the temperature in the bag is at least about 140° F. In general, it should be understood that the temperature of a heating element or a heat sink in the bag is preferably measured rather than the actual ambient temperature in the bag. The ambient temperature in the bag can be calculated based upon the measured temperature of the heating element or the heat sink. As the bag 400 is used and an article is either moved into the bag or removed from the bag, it is expected that the ambient temperature in the bag will change but will return to a desired temperature that is above about 140° F. The Food and Drug Administration has specified that 140° F. is a hot hold food safe temperature for transporting food.

The lights 406 and 408 can be provided as red and green lights, for example. It is expected that a start-up protocol can include a solid red light changing to flashing red indicating that the bag 400 is charging. The red light switch is off and the green light switch is on when the readiness set point threshold has been achieved. The readiness set point threshold refers to the temperature of the heating element or the heat sink provided within the bag 400. Preferably, the readiness set point threshold is at least about 200° F. It is believed that the readiness set point threshold can be used to fairly accurately calculate the temperature within the bag 400 in which the article to be heated 410 is exposed. Preferably, the article 410 includes a food item such as a pizza 412 provided within a cardboard box 414.

The bag 400 includes a top wall 416, a bottom wall 418, a rear wall 420, and side walls 422 and 424. Preferably, the walls include an insulation material 426 for reducing heat transfer from the interior area 428 of the bag 400 to exterior of the bag. The amount of insulation 426 provided in the walls can vary. As shown in FIG. 12, the top wall 416 includes a greater thickness of insulation material 426 than the bottom wall 418.

The bag 400 includes an interior area 428 that includes the article to be heated 410 and the heater 430. In general, the interior area 428 refers to the area within the bag 400 provided between the interior surfaces 432 of each wall. The interior area 428 includes an article transport area 440 and a heater storage area 442. The heater 430 can be contained within the heater storage area 442 by a holder 444. Preferably, the holder 444 includes a fabric cover 446 for containing the heater 430 in place. Preferably, the article 410 can be provided resting on the heater 430 and in thermally conductive contact with the heater 430. It should be appreciated that the phrase "thermally conductive contact" refers to the existence of heat transfer from the heater to the article. There is no requirement of direct contact between the heater and the article, although direct contact can be preferred. Preferably, the holder 444 includes a window 445 that allows viewing of the enunciating device 402.

The bag 400 includes a flap 450 that covers the bag opening. The flap 450 is selectively movable between an open position and a closed position. As shown in FIGS. 11 and 12, the flap 450 is provided in a closed position. When the flap 450 is moved to an open position, the article 410 can be removed from the bag 400.

The flap 450 can include a transparent material 452. By manufacturing at least a portion of the flap as a transparent material 452, it is possible to provide a window 453 for visually observing the enunciating device 402 provided within the interior area 428. The flap can be provided as an opaque material such as a fabric. In the case of an audio enunciating device, it is believed that it is not necessary to provide a window for viewing the interior of the bag. Furthermore, the flap 450 can be provided as a non-transparent material (to visible light) when the enunciating device is provided so that it is visible when the flap 450 is provided in the closed position, or when it is decided to be sufficient to only view the enunciating device when the flap 450 is provided in an open position. For example, the enunciating device can be provided attached to the bag exterior 455 or can be provided so that it hangs outside of the bag exterior 455. The flap can be held in a closed position by a fastener 454 such as a hook and loop fastener system 456.

The bag 400 can include handles 460 and 462 for transporting the bag. The heater 430 can be heated by electrical energy. A power cord 464 can be provided for providing electrical connectivity between the heater 430 and a power source. The power source can be provided by alternating current or direct current. The power cord 464 includes a plug 466 for connecting to a desired power source.

The heater can include a heating element 433 such as a resistive heating element, an induction heating element, and/or a microwave heating element. The heater can include a heat sink 435. The heat sink can be a sensible and/or latent polymeric based material, a sensible and/or latent ceramic-based material, a sensible and/or latent metal enclosure, and/or a latent heat storage micro encapsulated material. A preferred micro encapsulated material is in the form of a foam or gel and is available from Frisbee Technology. The heating element and heat sink material can be any of those materials previously referred to in this patent application. The power source for powering the enunciating device can include a conventional 120 and/or 220 volt line voltage input, a voltage reducing a current source transformer driven electronic isolating circuit, a conventional electronic non-isolated circuit, a bridge rectifier, a battery, a charged capacitor such as a standard battery and a rechargeable battery, and an induction driven, bag mounted, secondary coil (24 volts) with input/output enunciation device power supply only or with control and resistive grid power supply (24 volt).

The bag 400 includes a control unit 436 provided within a container 439. The control unit 437 includes a power connection 441 for instructing the heater 430 to heat. Additionally included is a temperature sensor 443 for sensing the temperature of the heating element 433 and/or the heat sink 435. The control unit 437 controls the supply of power received through the power cord 464. In addition, the enunciating device 402 can be connected to the control unit 437 or it can include its own control unit and its own sensor and power supply.

Figure 13A:
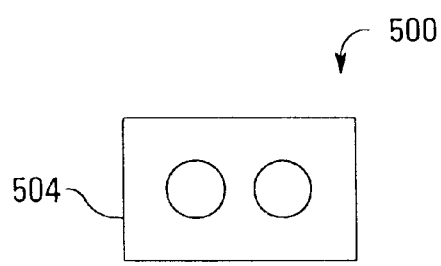
FIGS. 13(a)–(c) is a diagrammatic view of exemplary visual temperature displays according to the principles of the invention.
Figure 13B:
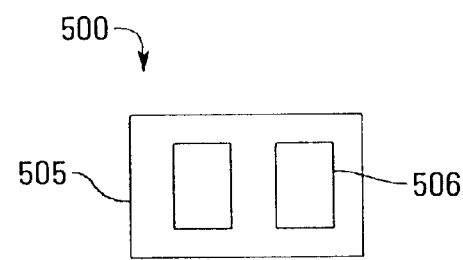
Figure 13C:
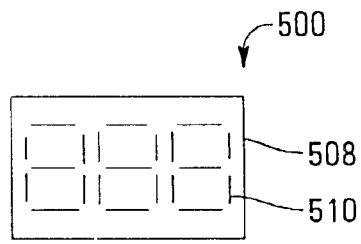
Figure 14:
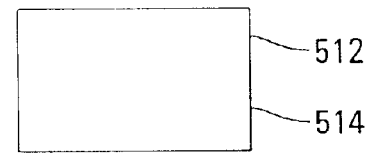
FIG. 14 is a diagrammatic view of an exemplary audio temperature display according to the principles of the invention.

Now referring to FIGS. 13 and 14, enunciating devices are shown. FIGS. 13(a)–(c) shows visual enunciating devices 500. FIG. 13(a) shows a rounded visual enunciation device 504. FIG. 13(b) shows a rectangular visual enunciation device 505. The rectangular visual enunciation device 505 is preferably in the form of lighted pipes 506. FIG. 13(c) shows a numeric visual enunciation device 508. The numeric visual enunciation device 508 includes three characters 510. Preferably, the visual enunciation devices are provided as LED displays.

An alternative enunciating device according to the invention can be referred to as an audio enunciating device. As shown in FIG. 14, an audio enunciating device 512 is shown. The audio enunciating device 512 preferably includes a voice chip 514 that synthesizes a human voice for audibly indicating the temperature within the delivery bag once provided with stimulation. It is believed that the voice chip can be stimulated by pressing a button and/or by opening the delivery bag.

Figure 15:
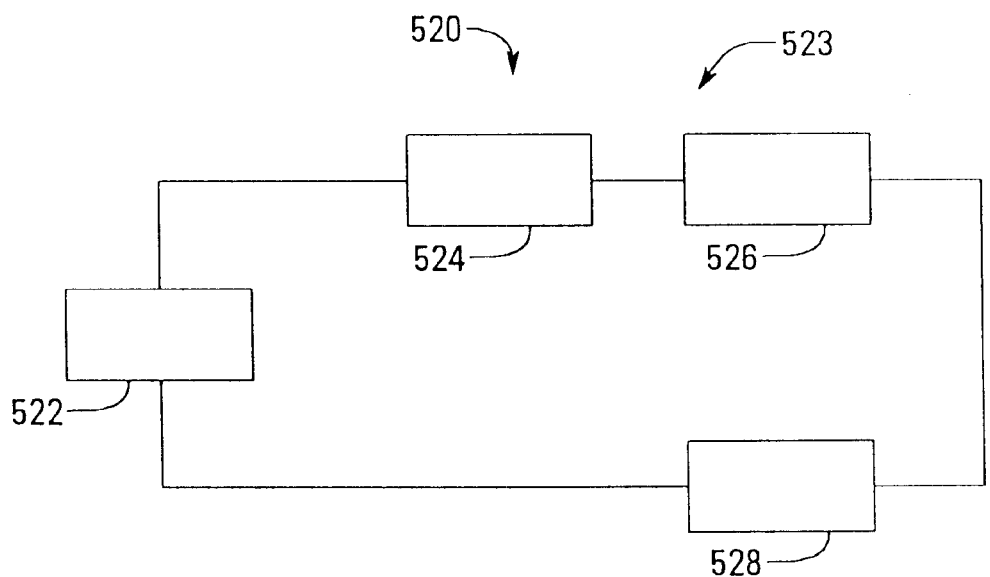
FIG. 15 is a functional block diagram illustrating operation of the enunciating device according to the principles of the invention.
Figure 16:
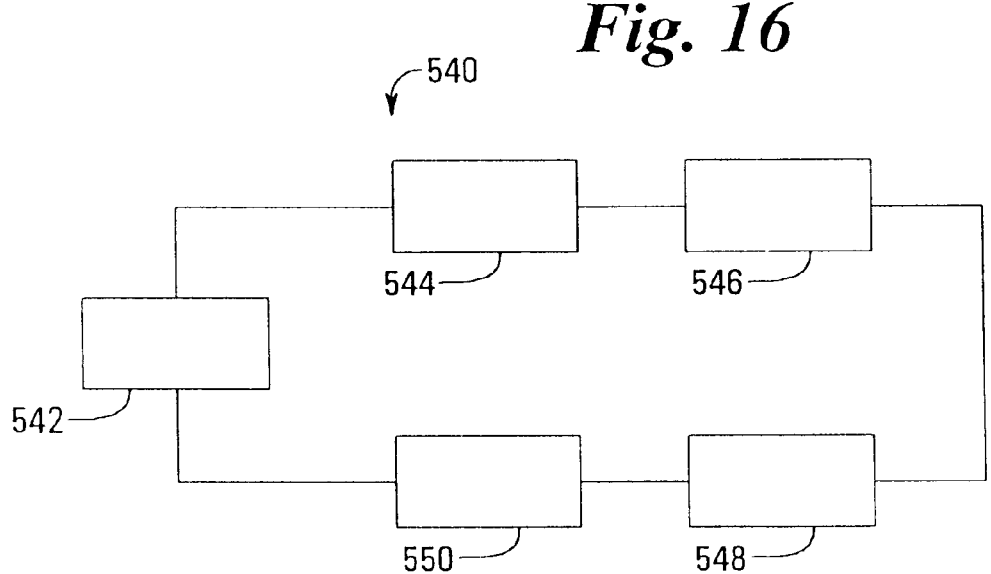
FIG. 16 is a functional block diagram illustrating operation of the enunciating device according to the principles of the invention.
Figure 17:
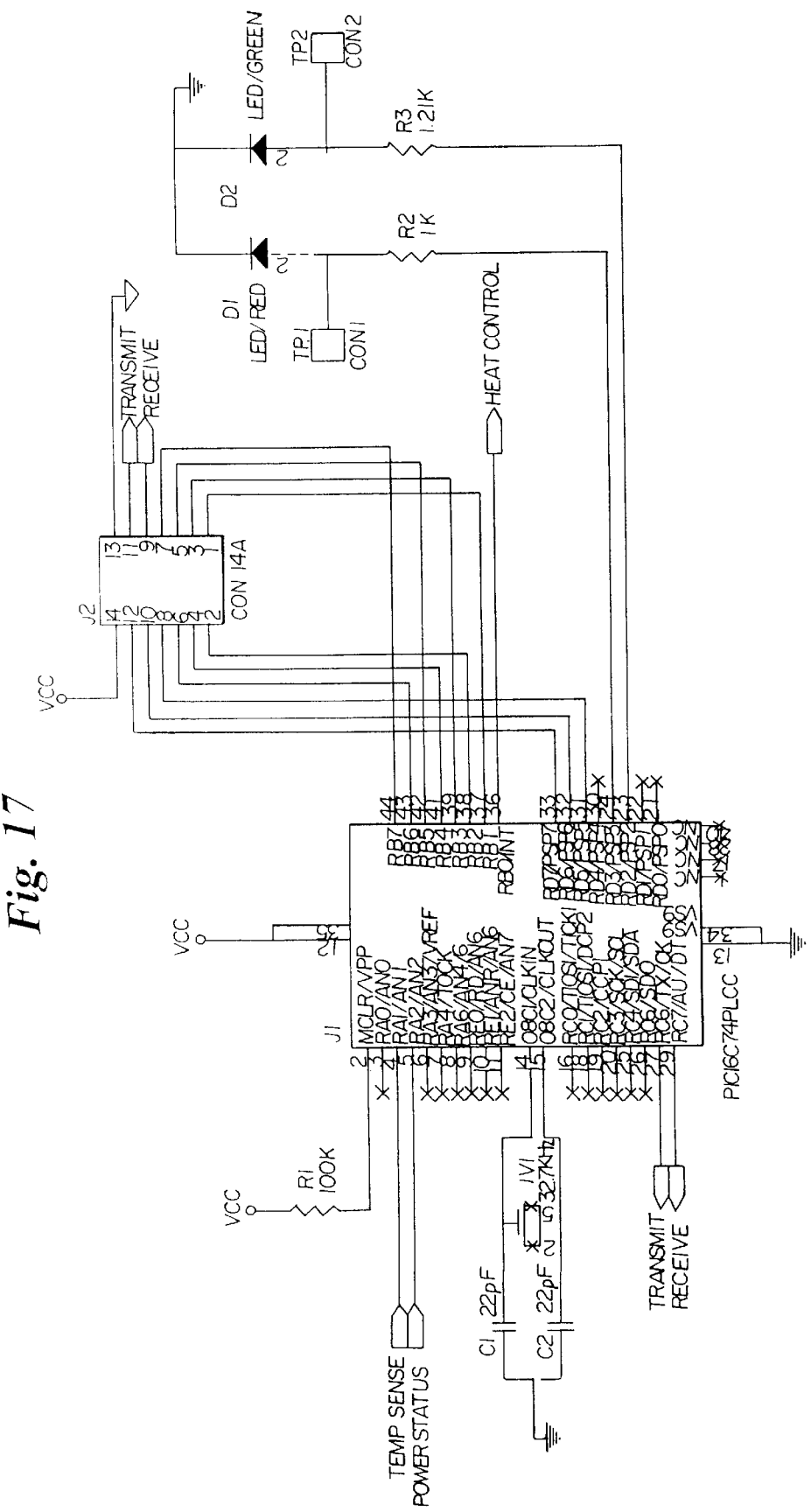
FIG. 17 is an exemplary electronic schematic diagram according to the principles of the invention.
Figure 18:
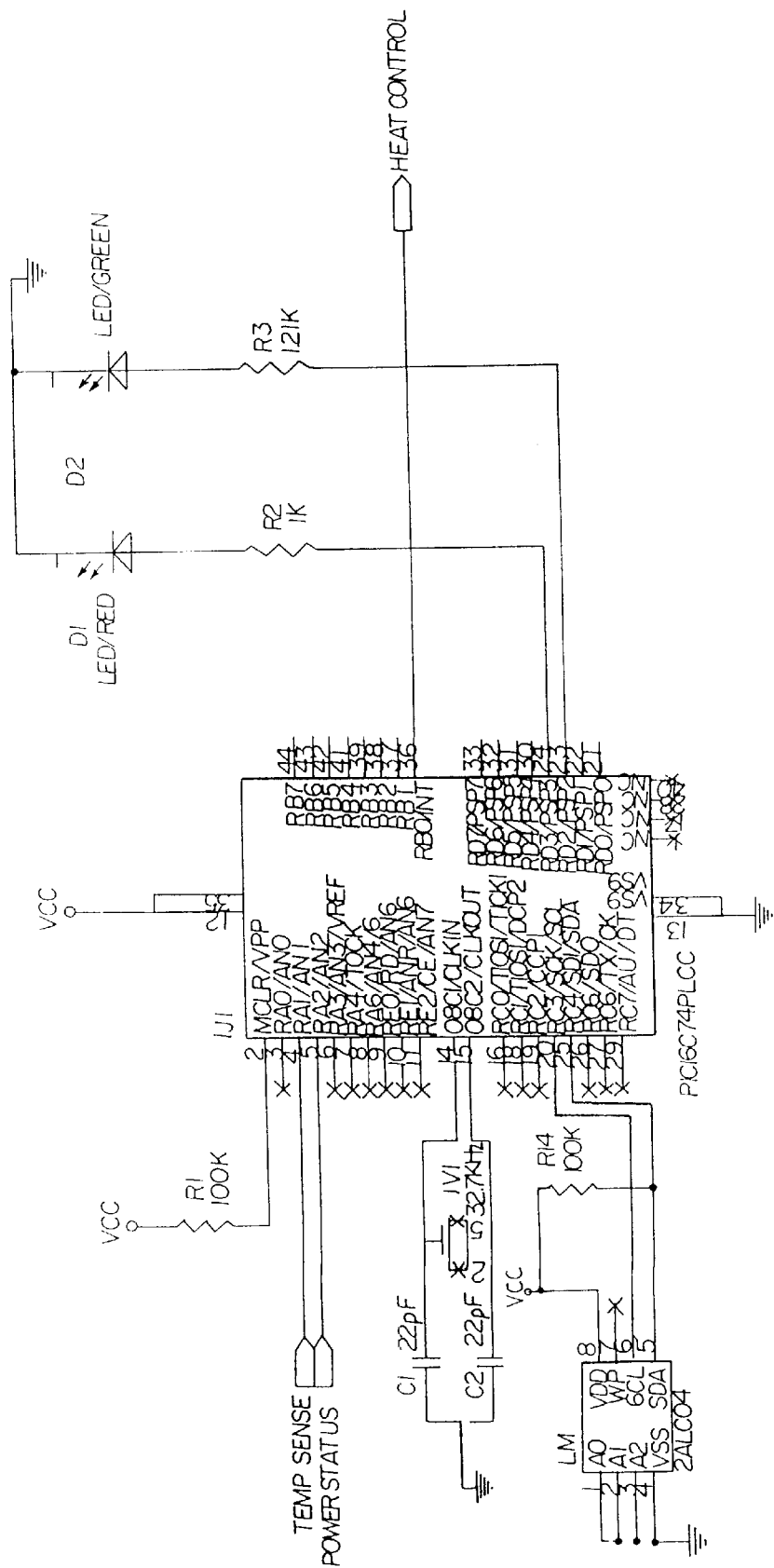
FIG. 18 is an exemplary electronic schematic diagram according to the principles of the invention.
Figure 19:
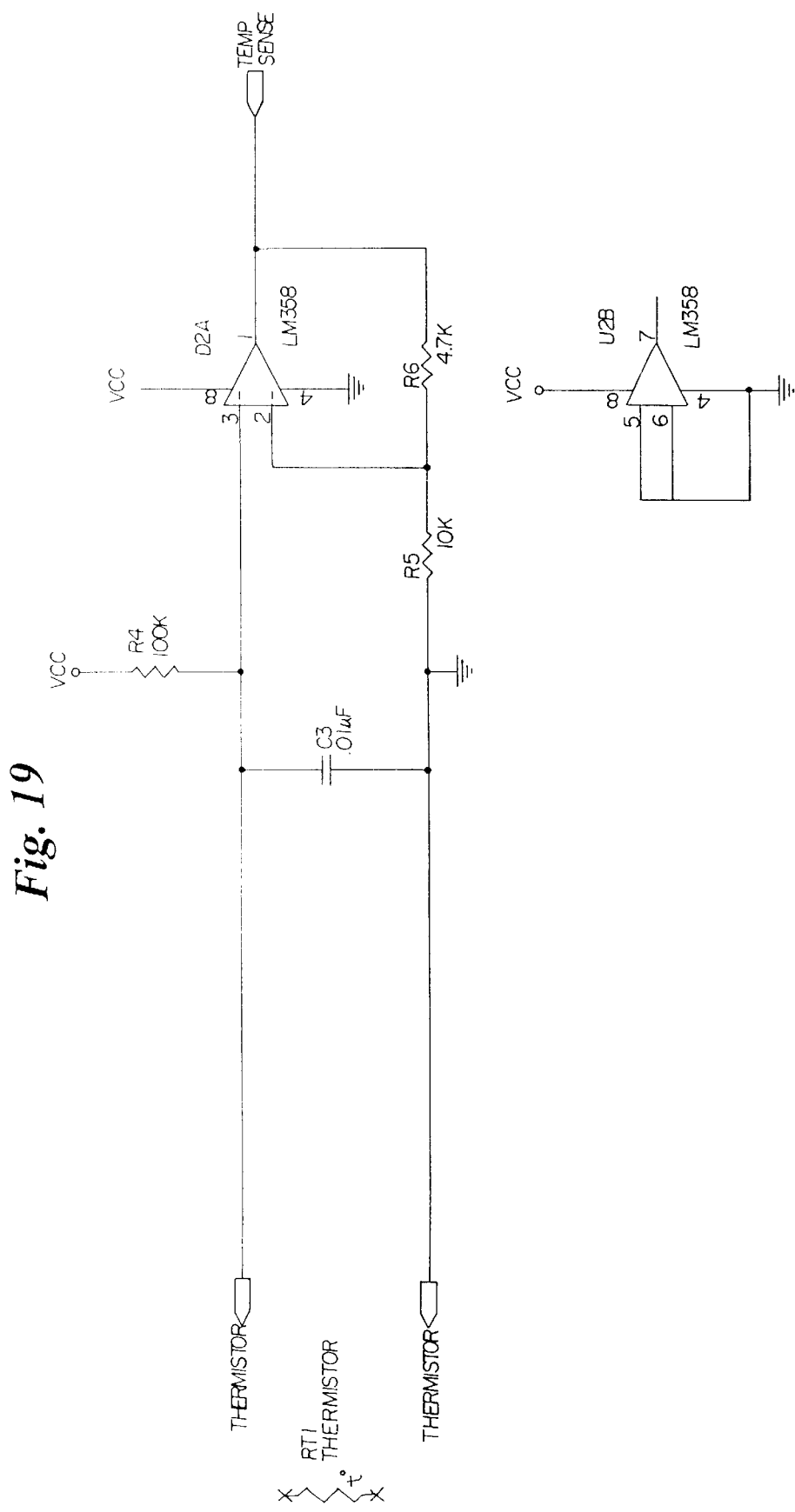
FIG. 19 is an exemplary electronic schematic diagram according to the principles of the invention.
Figure 20:
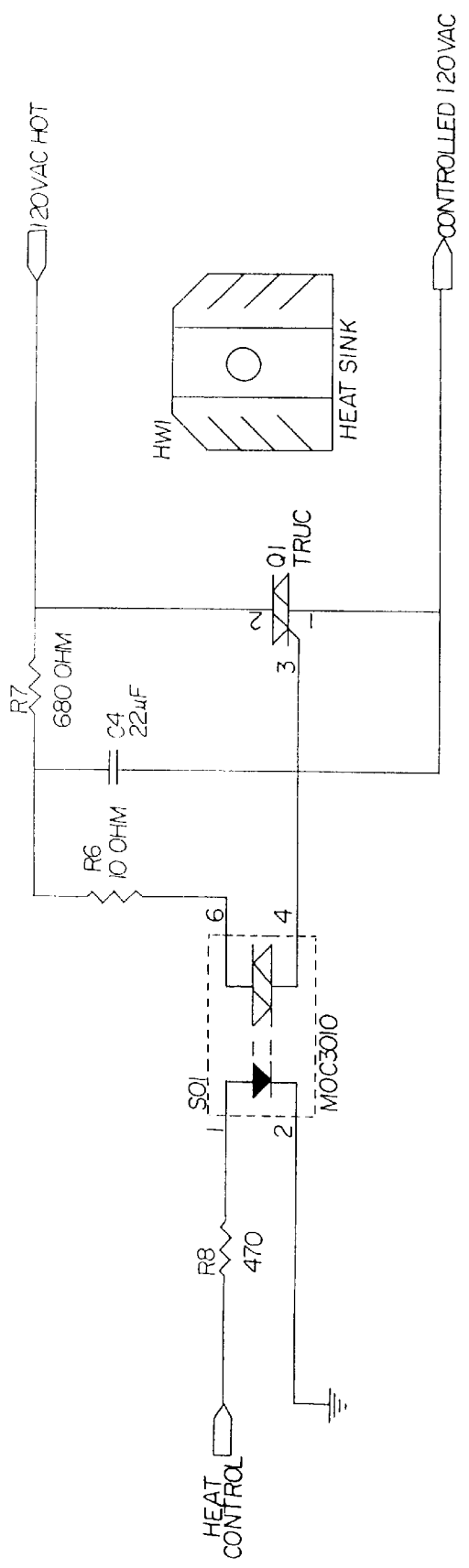
FIG. 20 is an exemplary electronic schematic diagram according to the principles of the invention.
Figure 21:
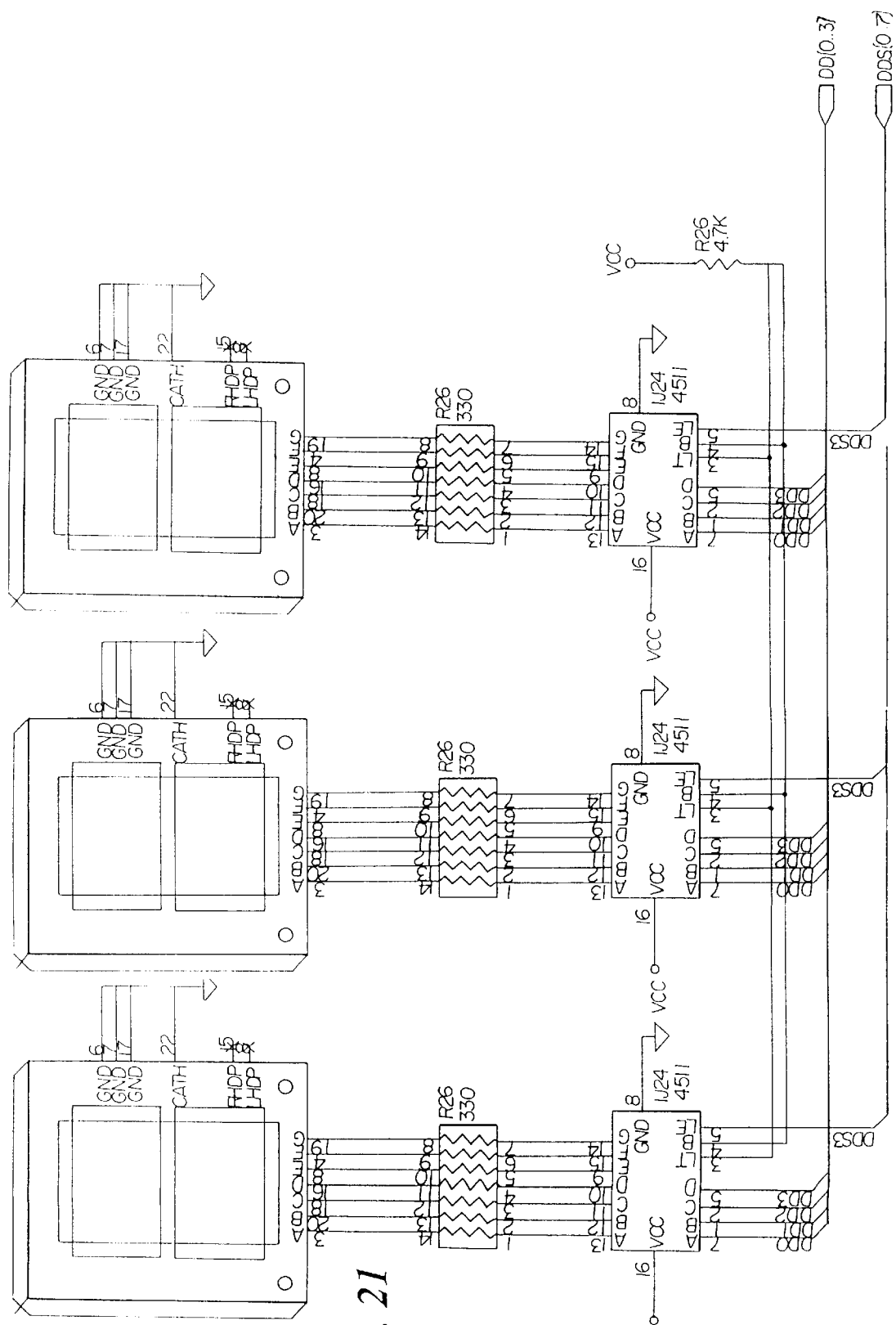
FIG. 21 is an exemplary electronic schematic diagram according to the principles of the invention.
Figures 22, 22A, 22B:
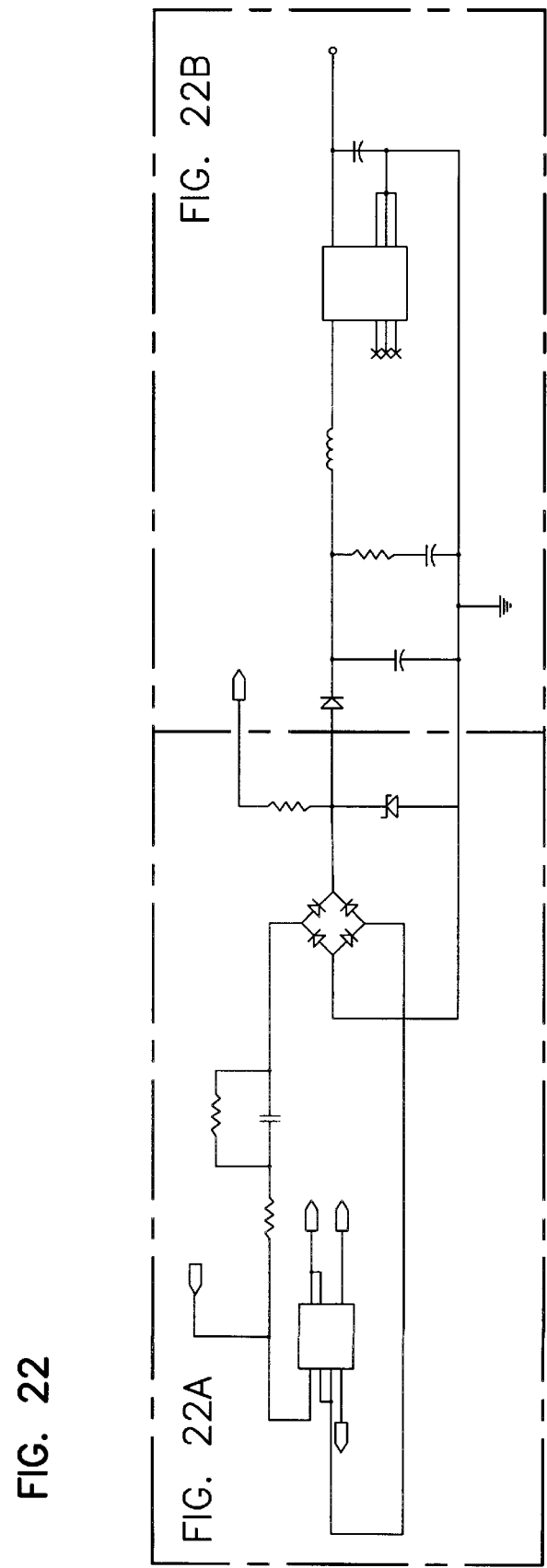
FIG. 22 is an exemplary electronic schematic diagram according to the principles of the invention.
FIG. 22A is an enlarged section of the electronic schematic diagram illustrated in FIG. 22.
FIG. 22B is an enlarged section of the electronic schematic diagram illustrated in FIG. 22.
Figure 22A:
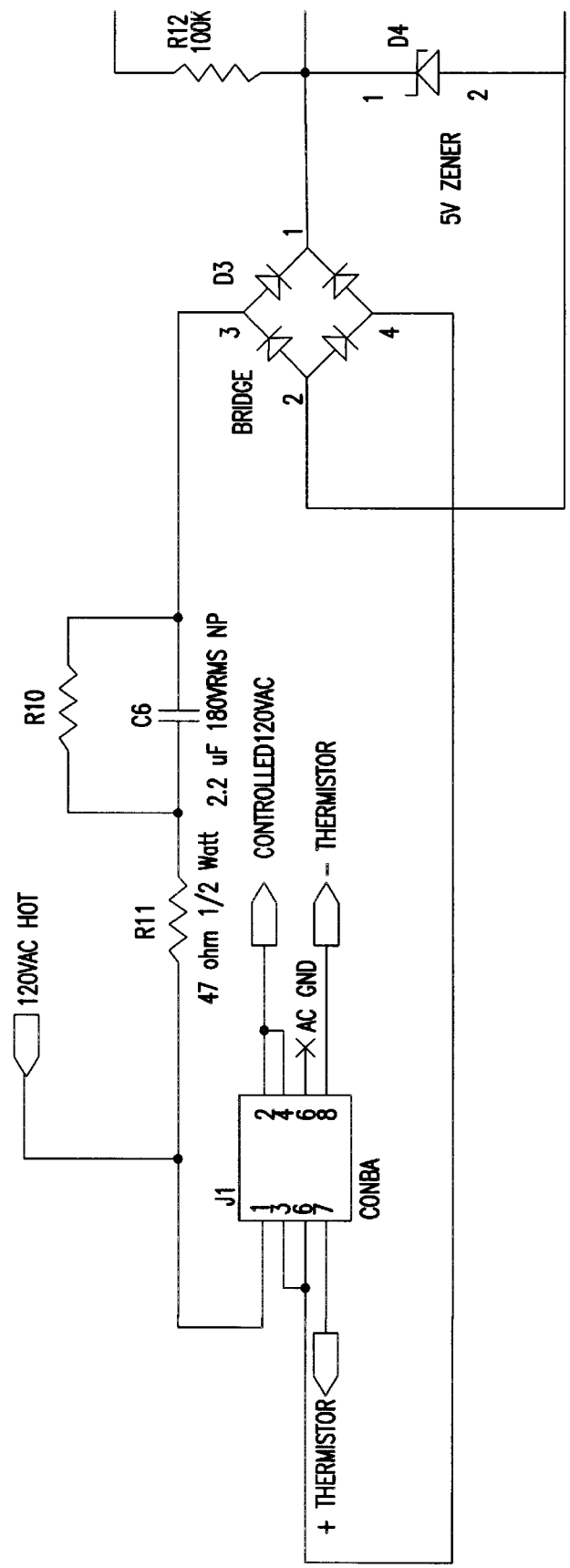
Figure 22B:
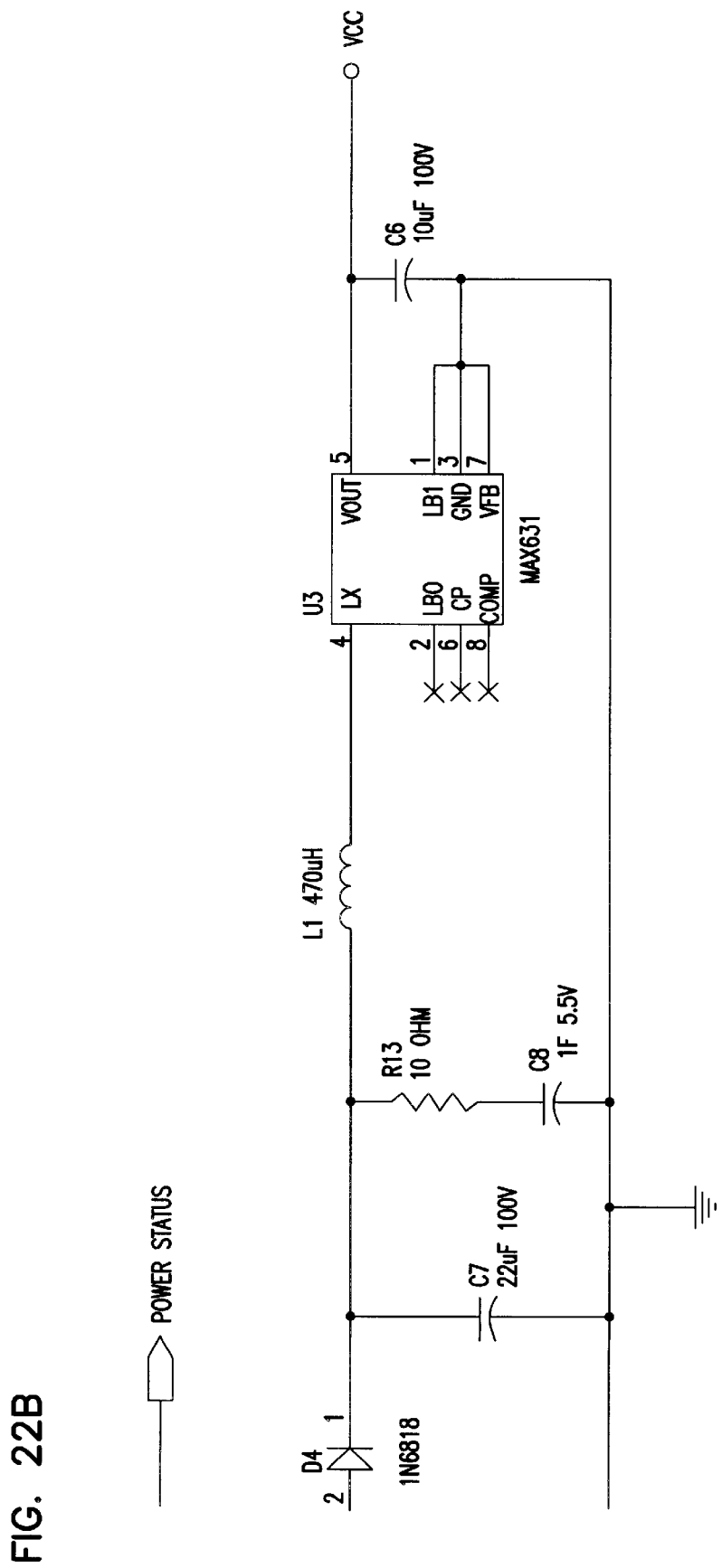
Figure 23A:
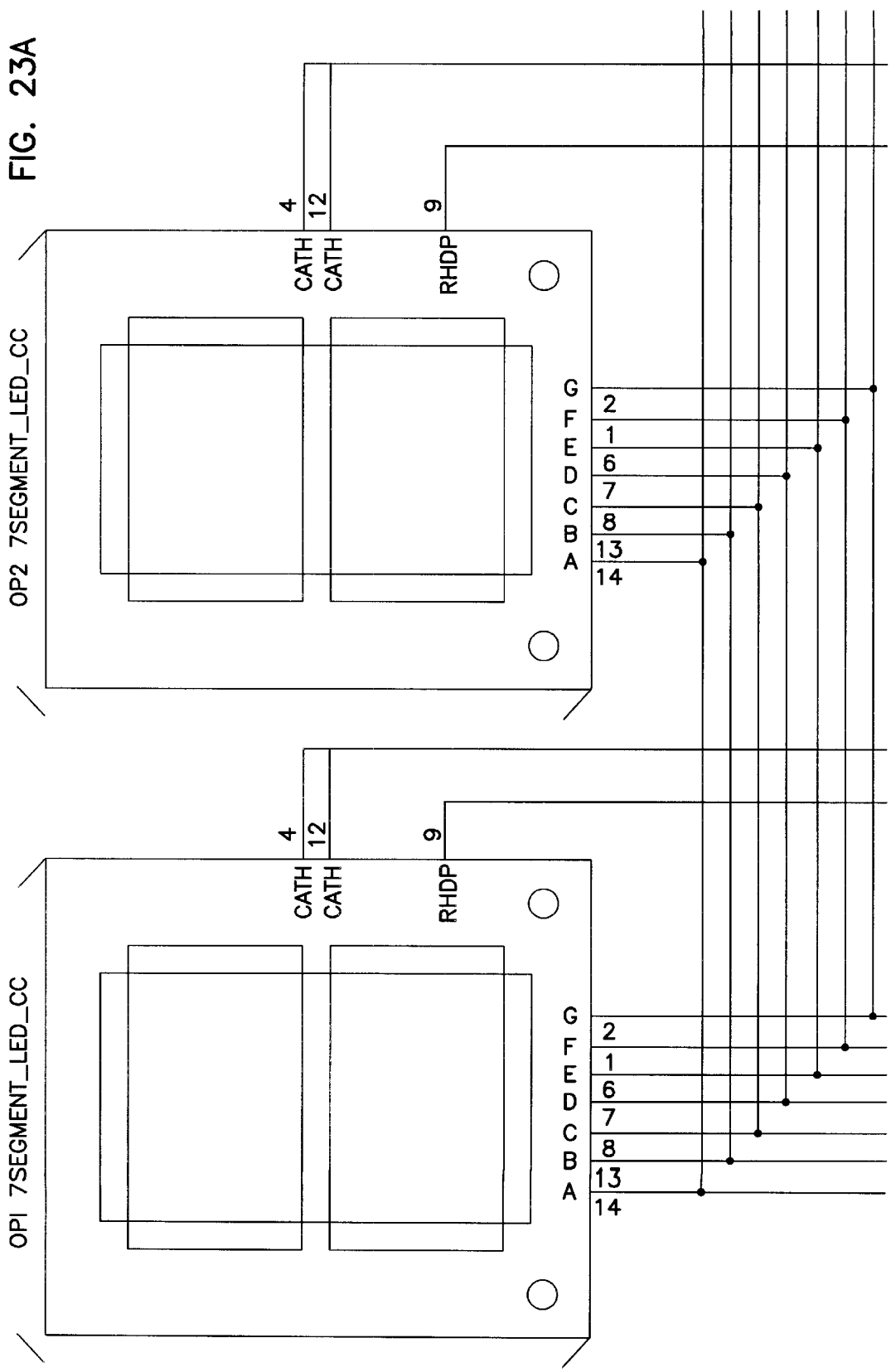
FIG. 23A is an enlarged section of the electronic schematic diagram illustrated in FIG. 23.
Figure 23B:
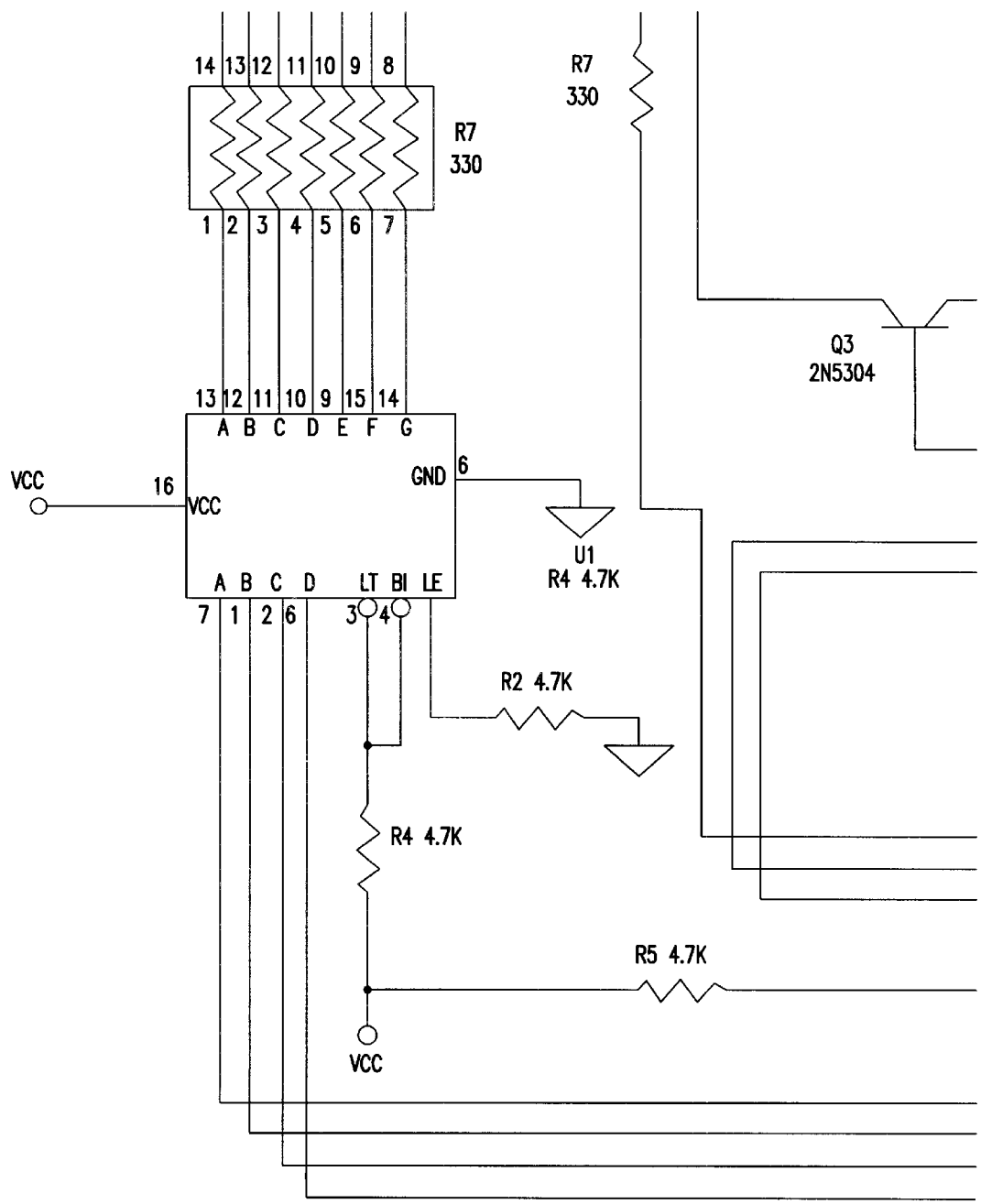
FIG. 23B is an enlarged section of the electronic schematic diagram illustrated in FIG. 23.
Figure 23C:
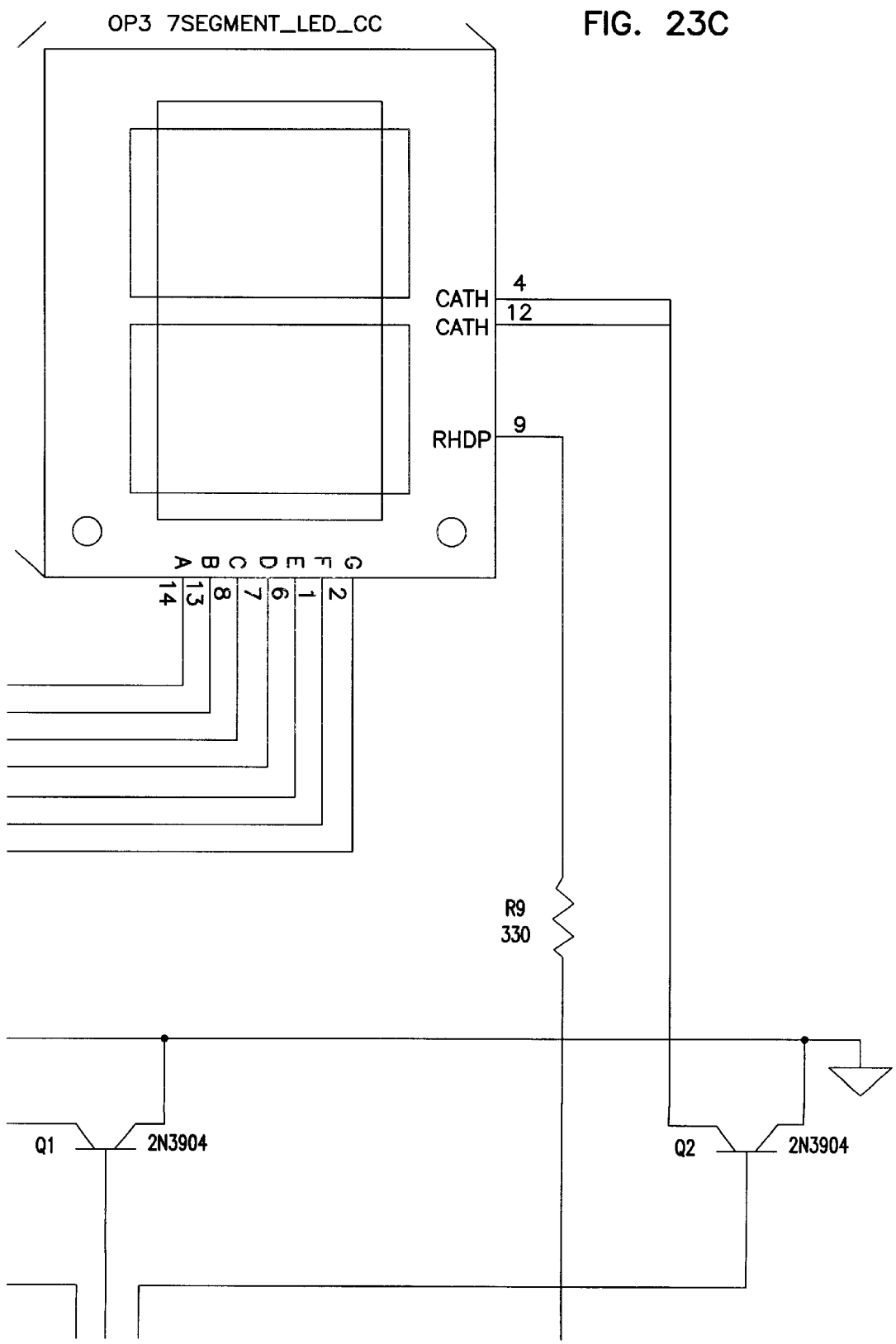
FIG. 23C is an enlarged section of the electronic schematic diagram illustrated in FIG. 23.
Figure 23D:
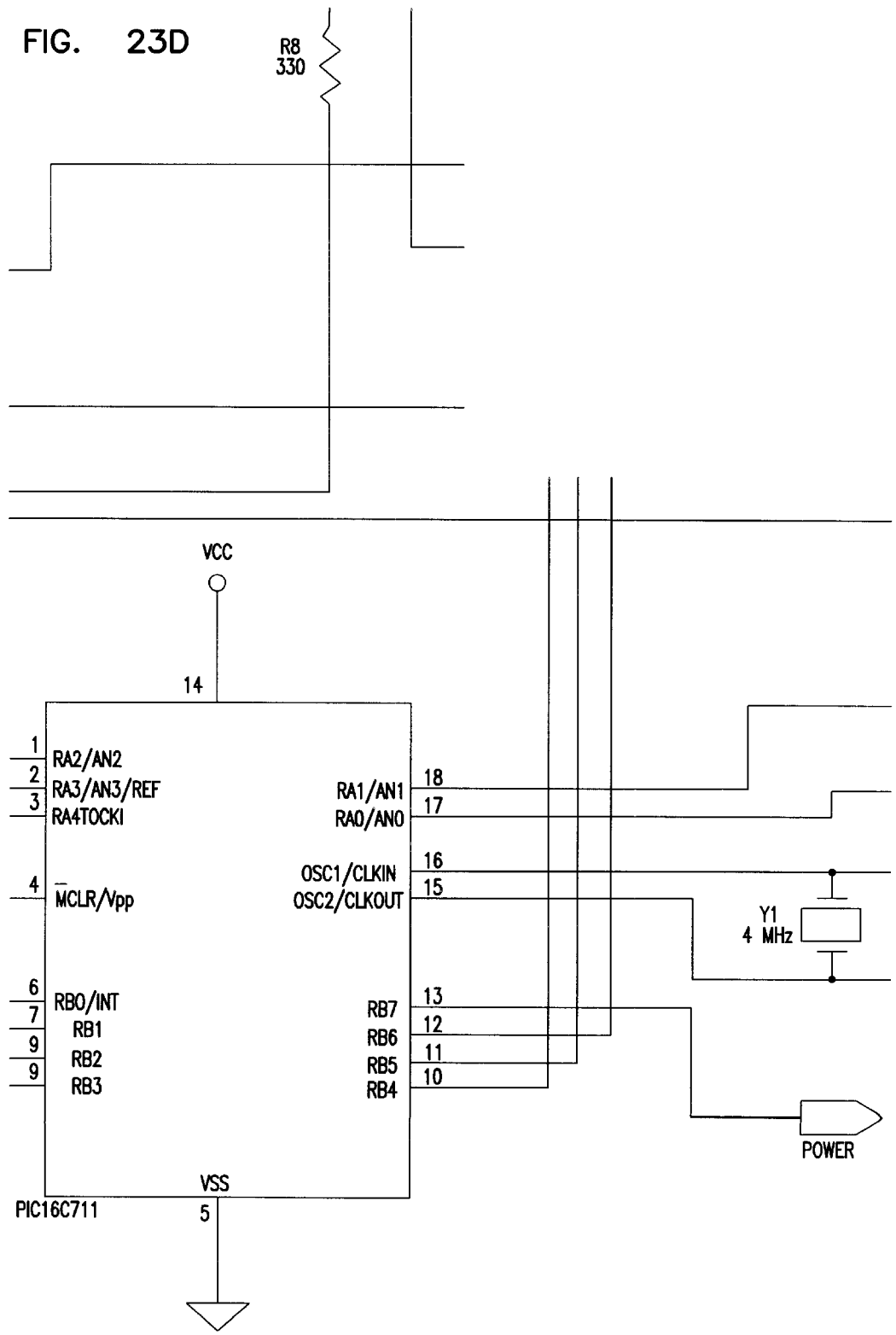
FIG. 23D is an enlarged section of the electronic schematic diagram illustrated in FIG. 23.
Figure 23E:
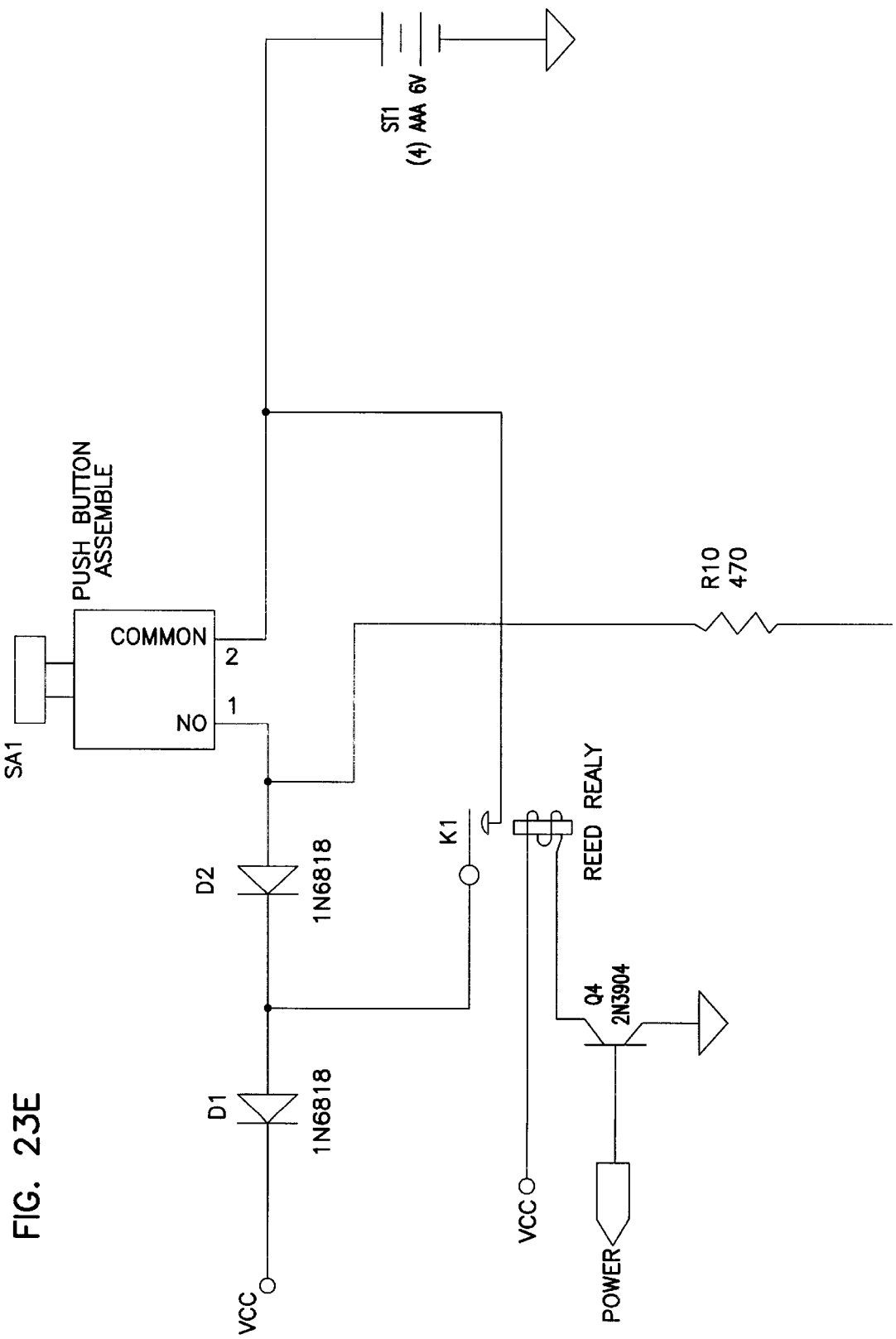
FIG. 23E is an enlarged section of the electronic schematic diagram illustrated in FIG. 23.
Figure 23F:
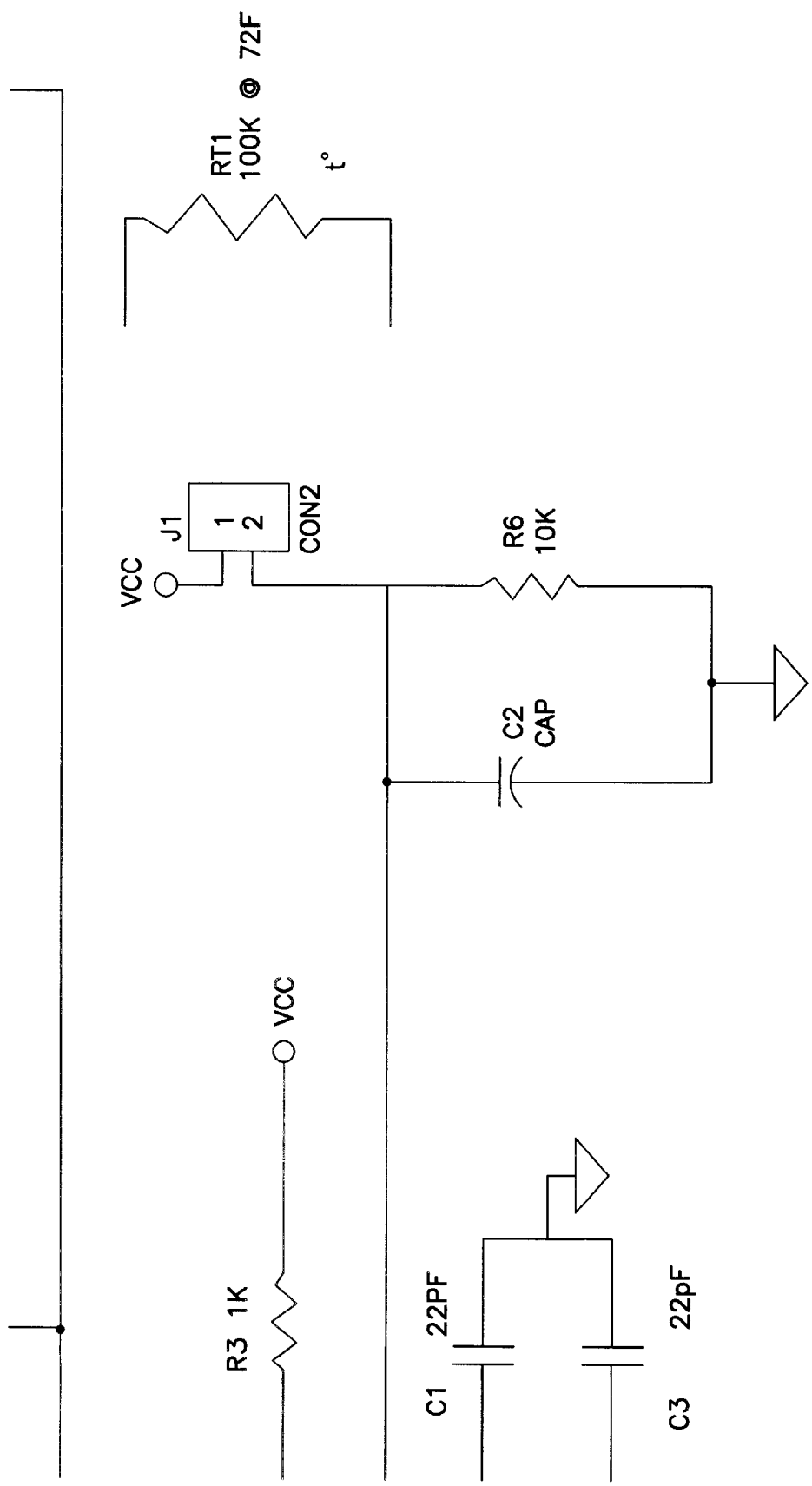
FIG. 23F is an enlarged section of the electronic schematic diagram illustrated in FIG. 23.
Figure 24:
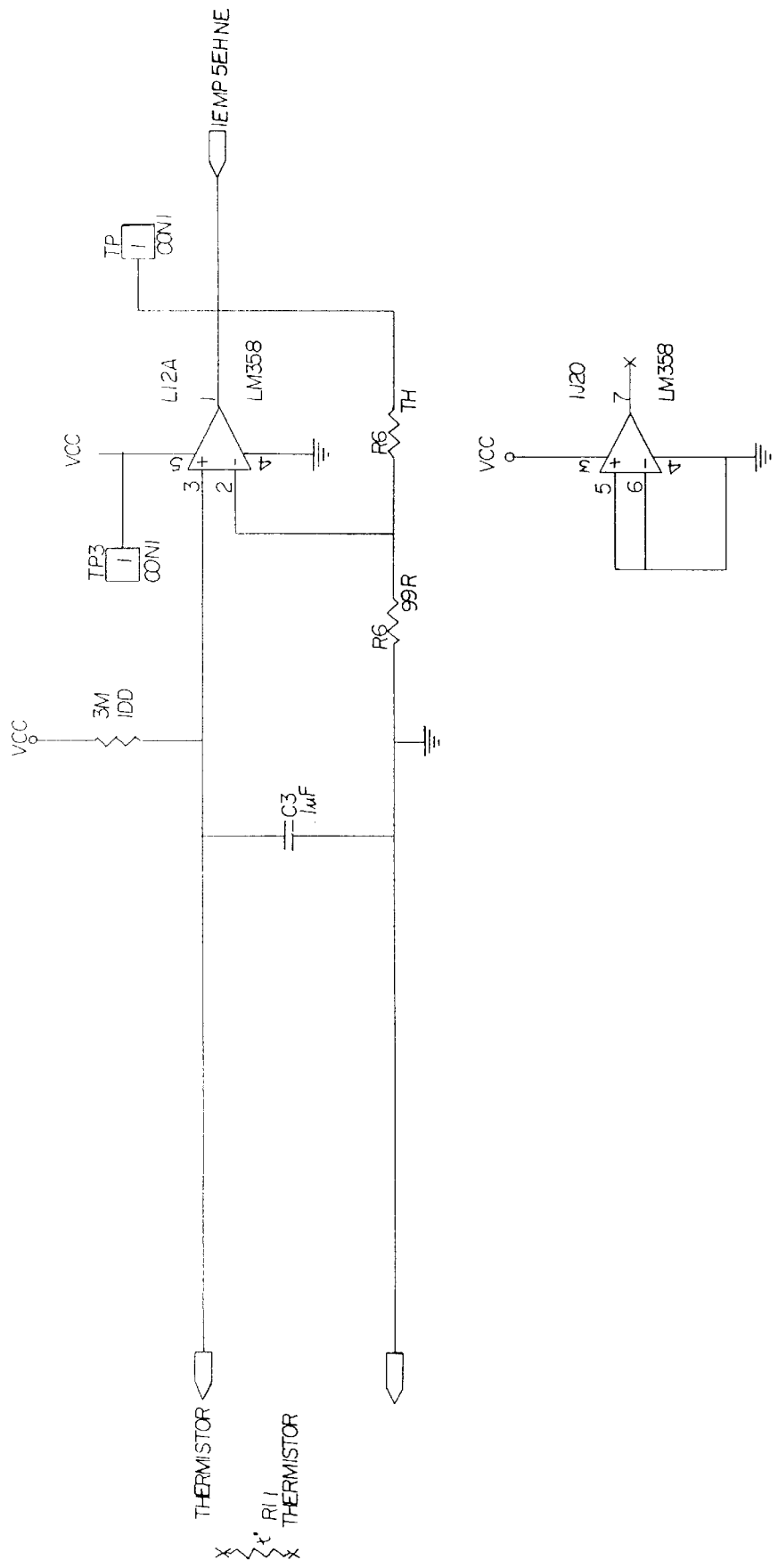
FIG. 24 is an exemplary electronic schematic diagram according to the principles of the invention.
Figure 25:
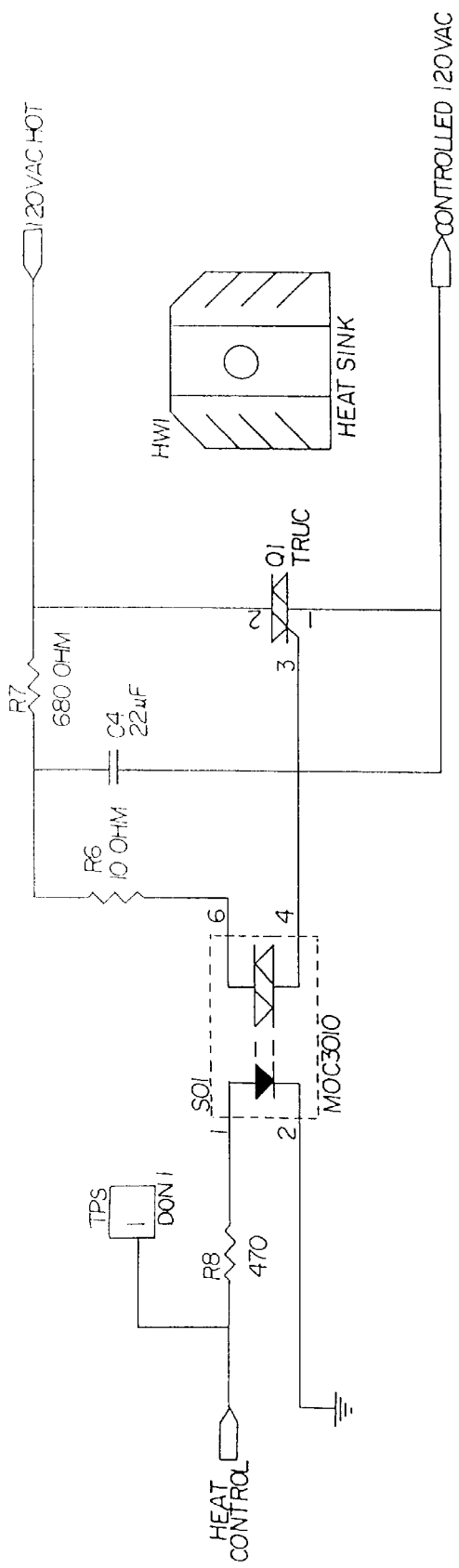
FIG. 25 is an exemplary electronic schematic diagram according to the principles of the invention.
Figure 26:
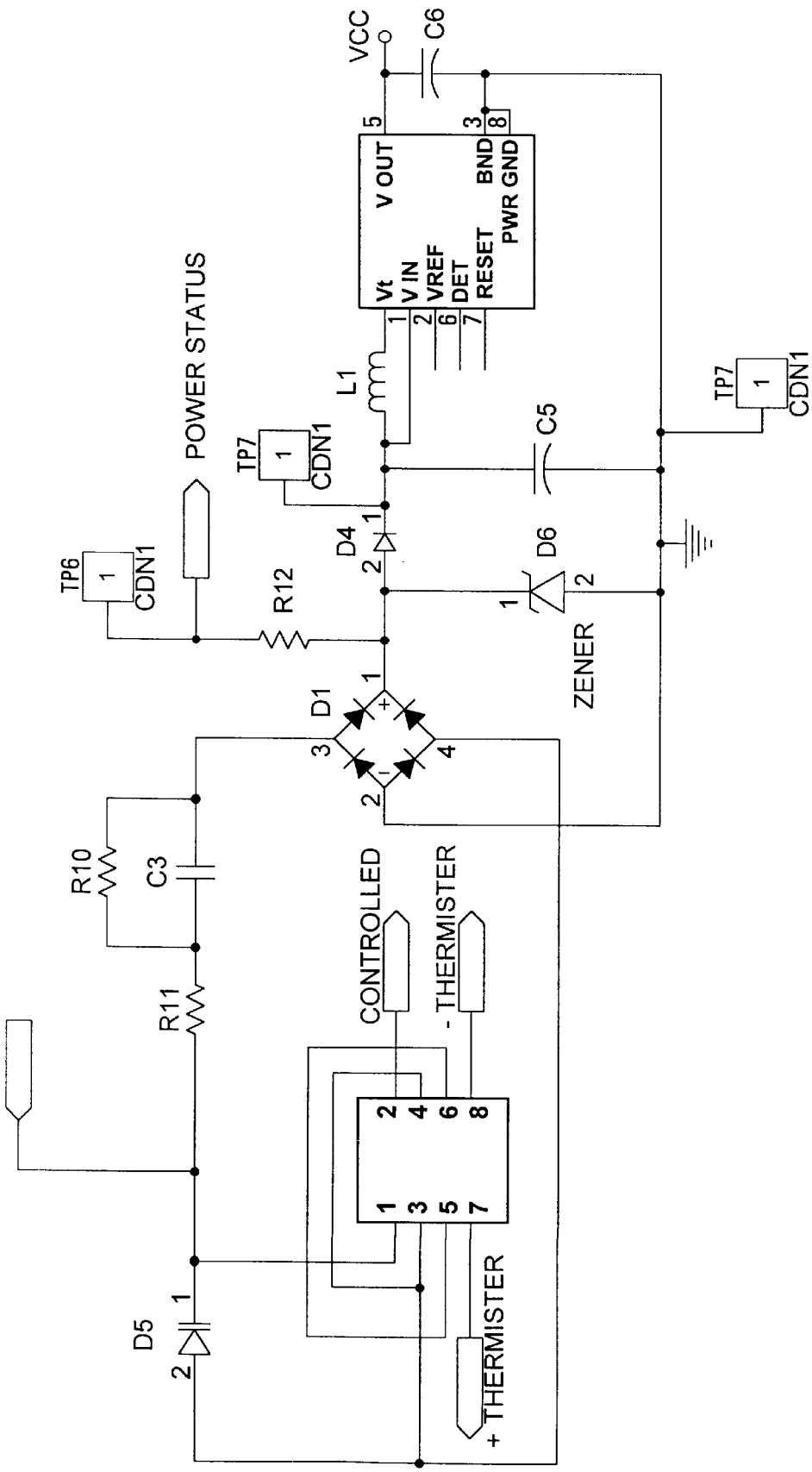
FIG. 26 is an exemplary electronic schematic diagram according to the principles of the invention.

Now referring to FIGS. 15 and 16, functional block diagrams for operating the enunciation device according to the invention are provided. FIG. 15 shows a functional block diagram that does not include a control for controlling the temperature within the delivery bag. The functional block diagram 520 includes a power source 522, a trigger 524, a temperature sensor 526, and a display 528. In general, the power source 522 can include any power source sufficient to drive the circuit 523. Preferred power sources include batteries including commercially available batteries and rechargeable batteries. In addition, the power source can be induction driven. That is, when the heating source for the delivery bag is driven by induction heating, a secondary coil can be provided which charges upon exposure to the induction force, thereby providing a power source for operating the circuit 523. In addition, the power source can be bridge rectified, voltage reduced current source, charged capacitor, and/or transformer driven isolated circuit. The trigger 524 can be any trigger that generates the display 528. It is possible that the trigger 524 is always on thereby always causing the display 528 to enunciate the temperature conditions within the delivery bag. Of course, the enunciating device can be provided without a trigger so that it is always "on." In order to prolong the longevity of the power source 522, it is possible to provide a trigger 524 which, when activated, causes the display 528 to enunciate the temperature conditions within the delivery bag. The trigger can be a button, a switch, and any opto coupler switch such as a light sensor or photocell or an infrared emitter/receiver switch. The temperature sensor 526 can be any temperature sensor such as a thermometer or thermocouple that senses the temperature conditions within the delivery bag. The temperature sensor can include a thermister, a thermocouple, an RTD, and/or bimetal thermostat. The display 528 is preferably an enunciating device such as one of the enunciating devices previously described. Preferred displays include digital readouts, alternating light patterns demonstrating different conditions, and voice chips.

FIG. 16 shows a functional block diagram 540 including a power source 542, a trigger 544, a temperature sensor 546, a control 548, and a display 550. It should be appreciated that the power source 542, the trigger 544, the temperature sensor 546, and the display 550 can be similar to the power source 522, the trigger 524, the temperature sensor 526, and the display 528. The diagram 540 is different from the diagram 520 in that the diagram 540 includes a controller 548. The controller 548 is preferably provided for controlling the temperature within the delivery bag. Accordingly, the controller 548 is preferably provided with an ability to generate a feedback to the heating element within the delivery bag.

The enunciating device is preferably constructed to work when connected to a secondary power source and continue working when disconnected from the secondary power source. That is, it can be powered by its primary power source. In addition, the enunciating device is preferably portable which means that it can be attached and detached from a delivery apparatus. Furthermore, the enunciating device is preferably constructed to be operated at a temperature greater than 140° F., and is sufficiently light weight.

Preferably, the enunciating device weighs less than 0.5 lb. and preferably less than three ounces. In addition, the enunciating device preferably can be either permanently installed in a delivery apparatus or retrofitted to a variety of delivery apparatus and to the heat sink of the delivery apparatus.

The above specification, examples and data provide a complete description of the manufacture and use device of the invention. Since many embodiments of the invention can be made without departing from the spirit and scope of the invention, the invention resides in the claims hereinafter appended.

We claim:

1. A pizza delivery apparatus comprising:
   (a) a container comprising a plurality of walls defining a container interior;
      (i) said container including an opening sized for movement of at least one pizza box into and out of the container interior;
      (ii) said container including a flap positioned for selective closing of the opening;
   (b) an enunciating device comprising:
      (i) a temperature sensor for sensing a temperature condition within the container;
      (ii) an electrically powered display for displaying information concerning a temperature condition detected by the temperature sensor; and
      (iii) an enunciating device power source for electrically powering the electrically powered display;
   (c) a heater selectively positionable within the container in heat transfer relationship with the container interior; said heater being powered by a heater power source; and,
   (d) a heater controller comprising:
      (i) a switch electrically coupled to the heater for activating and deactivating power from a heater power source to the heater; and,
      (ii) a central processor unit configured to control the switch to:
         (A) cause heating of the heating grid from an initial temperature to a higher temperature, said higher temperature being at least 240° F.;
         (B) allow the heating grid to cool to a lower temperature; and,
         (C) thereafter operate the control switch, as programmed, in response to detected temperature conditions;
         (D) said higher temperature being at least 30° F. higher than said lower temperature.

2. A pizza delivery apparatus according to claim 1 wherein:
   (a) said heater comprises a heating grid having a watt density of at least 2.5 watts per square inch.

3. A pizza delivery apparatus according to claim 2 wherein:
   (a) the heating grid is a mica heating grid.

4. A pizza delivery device according to claim 3 wherein:
   (a) the heating grid is a 300 watt mica heating grid.

5. A pizza delivery device according to claim 3 wherein:
   (a) the heater includes a polycarbonate heat sink.

6. A pizza delivery device according to claim 5 wherein;
   (a) said polycarbonate heat sink is positioned such that, when said pizza delivery device is used to deliver pizza, at least a portion of said polycarbonate heat sink is positioned between said mica heating grid and said pizza.

7. A pizza delivery device according to claim 5 wherein:
   (a) the polycarbonate heat sink has a shape comprising a square central portion with four wings, one wing extending from each corner of the square central portion.

8. A pizza delivery device according to claim 7 wherein:
   (a) the heating grid has an area of 100 square inches.

9. A pizza delivery apparatus according to claim 2 wherein:
   (a) the heating grid has a watt density of at least 3.0 watts per square inch.

10. A pizza delivery apparatus according to claim 2 wherein:
    (a) the heater is of a type to be powered by an AC power source and includes an AC power cord.

11. A pizza delivery apparatus according to claim 10 wherein:
    (a) the enunciating device power source comprises a capacitor arrangement positioned to selectively power the electronically powered display of the enunciating device when the heater is not connected to an AC power source.

12. A pizza delivery apparatus according to claim 11 wherein:
    (a) the electrically powered display of the enunciating device includes at least one LED.

13. A pizza delivery apparatus according to claim 12 wherein:
    (a) the electrically powered display of the enunciating device includes a green LED.

14. A pizza delivery apparatus according to claim 1 wherein:
    (a) said container includes: a bottom wall, a top wall, a back wall, and first and second sidewalls.

15. A pizza delivery apparatus according to claim 14 wherein:
    (a) said flap comprises an extension of at least one of the bottom wall, top wall, first sidewall and second sidewall.

16. A pizza delivery apparatus according to claim 15 wherein:
    (a) the container includes a hook and loop fastener positioned to selectively secure the flap in a closed orientation.

17. A pizza delivery apparatus according to claim 16 wherein:
    (a) the container includes handles for transporting the bag.

18. A pizza delivery device according to claim 1 wherein:
    (a) the enunciating device power source comprises a rechargeable battery arrangement positioned to selectively power the electronically powered display of the enunciating device when the heater is not connected to a power source.

* * * * *